(12) United States Patent
Kamat et al.

(10) Patent No.: US 10,225,411 B2
(45) Date of Patent: *Mar. 5, 2019

(54) SELECTION OF NETWORKS FOR VOICE CALL TRANSMISSION

(71) Applicant: Google Inc., Mountain View, CA (US)

(72) Inventors: Mayur Kamat, Redmond, WA (US); Alexander E. Wiesen, Santa Clara, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/593,279

(22) Filed: May 11, 2017

(65) Prior Publication Data

US 2017/0244840 A1 Aug. 24, 2017

Related U.S. Application Data

(63) Continuation of application No. 14/477,807, filed on Sep. 4, 2014, now Pat. No. 9,654,645.

(51) Int. Cl.
*H04M 7/00* (2006.01)
*H04M 7/12* (2006.01)

(52) U.S. Cl.
CPC ....... *H04M 7/1285* (2013.01); *H04M 7/0006* (2013.01); *H04M 7/0057* (2013.01); *H04M 2203/158* (2013.01)

(58) Field of Classification Search
CPC ..... H04W 36/24; H04W 40/02; H04W 76/02; H04W 88/06; H04W 88/16; H04L 12/14;
(Continued)

(56) References Cited

U.S. PATENT DOCUMENTS

| 5,327,486 A | 7/1994 | Wolff et al. |
|---|---|---|
| 5,608,786 A | 3/1997 | Gordon |

(Continued)

FOREIGN PATENT DOCUMENTS

WO 2012/143536 10/2012

OTHER PUBLICATIONS

"How Cisco India Simplified VoIP and PSTN calls with Logical Partitioning for Cisco Unified Communications Manager", Cisco IT Case Study, Logical Partitioning for Cisco Unified Communications Manager, Cisco Systems, Inc., 1992-2011, 6 pages.

(Continued)

*Primary Examiner* — Eric Nowlin
(74) *Attorney, Agent, or Firm* — IP Spring

(57) ABSTRACT

Implementations relate to selection of networks for voice call transmission. In some implementations, a method includes determining a voice call for communication between a sending device initiating the voice call and a receiving device and determining one or more first characteristics of the voice call. The method selects, based on the first characteristics, one of a phone network and a data network to use to route data of the voice call from the sending device to an intermediary server on the data network. The method causes the data of the voice call to be sent to the intermediary server over the selected network. The data of the voice call is sent from the intermediary server to the receiving device on one of the phone network and the data network chosen by the intermediary server based on one or more second characteristics of the call.

20 Claims, 9 Drawing Sheets

(58) Field of Classification Search
CPC ..... H04L 12/28; H04L 12/56; H04L 12/5692; H04L 12/588; H04L 12/589; H04L 12/66; H04L 29/12896; H04L 45/54; H04L 51/32; H04L 51/36; H04L 61/605; H04L 65/1006; H04L 65/1053; H04L 65/403; H04L 65/80; H04L 67/22; H04L 67/24; H04M 1/2218; H04M 1/2535; H04M 1/72552; H04M 3/007; H04M 3/2218; H04M 3/2227; H04M 3/42025; H04M 3/42042; H04M 3/42059; H04M 3/42255; H04M 3/42263; H04M 3/42382; H04M 3/567; H04M 7/0006; H04M 7/006; H04M 7/0066; H04M 7/009; H04M 7/1205; H04M 15/56

See application file for complete search history.

(56) References Cited

U.S. PATENT DOCUMENTS

| | | | |
|---|---|---|---|
| 5,929,897 A | 7/1999 | Schneider et al. | |
| 6,212,550 B1 | 4/2001 | Segur | |
| 6,304,648 B1 | 10/2001 | Chang | |
| 6,389,005 B1 | 5/2002 | Cruickshank | |
| 6,421,439 B1 | 7/2002 | Liffick | |
| 6,538,996 B1 | 3/2003 | West et al. | |
| 6,560,329 B1 | 5/2003 | Draginich et al. | |
| 6,590,869 B1 | 7/2003 | Beyda et al. | |
| 6,714,793 B1 | 3/2004 | Carey | |
| 6,728,357 B2 | 4/2004 | O'Neal | |
| 6,781,983 B1 | 8/2004 | Armistead | |
| 6,947,415 B1* | 9/2005 | Nagaraj | H04L 45/02 370/252 |
| 7,016,338 B2 | 3/2006 | Gunn et al. | |
| 7,065,186 B1 | 6/2006 | Myers et al. | |
| 7,269,629 B2 | 9/2007 | Zmudzinski et al. | |
| 7,315,548 B2* | 1/2008 | Joshi | H04L 45/02 370/401 |
| 7,321,921 B2 | 1/2008 | Malik | |
| 7,409,428 B1 | 8/2008 | Brabec et al. | |
| 7,512,400 B2 | 3/2009 | Starbuck et al. | |
| 7,613,106 B2 | 11/2009 | Baldwin et al. | |
| 7,765,263 B1 | 7/2010 | Alfke et al. | |
| 7,792,906 B2 | 9/2010 | Garcia-Martin et al. | |
| 7,813,332 B1 | 10/2010 | Voit et al. | |
| 7,840,217 B2* | 11/2010 | Patel | H04L 63/0407 370/328 |
| 8,068,840 B2* | 11/2011 | Patel | H04L 63/0407 370/328 |
| 8,161,116 B2 | 4/2012 | Chaddha et al. | |
| 8,223,666 B2* | 7/2012 | Jarvis | H04L 45/02 370/254 |
| 8,223,951 B1 | 7/2012 | Edelhaus et al. | |
| 8,274,970 B2 | 9/2012 | Bennett et al. | |
| 8,462,642 B2 | 6/2013 | Yang | |
| 8,483,729 B2 | 7/2013 | Knotts | |
| 8,559,320 B2 | 10/2013 | Khanduri | |
| 8,687,626 B2 | 4/2014 | Hawkins | |
| 8,743,709 B1 | 6/2014 | Stegall | |
| 8,854,951 B2* | 10/2014 | Godfrey | H04L 45/023 370/218 |
| 8,908,678 B1 | 12/2014 | McGonigal et al. | |
| 9,049,262 B2 | 6/2015 | Massover et al. | |
| 9,319,853 B2 | 4/2016 | Li et al. | |
| 9,380,446 B2* | 6/2016 | Zhou | H04W 8/02 |
| 9,392,628 B2* | 7/2016 | Zisimopoulos | H04L 63/102 |
| 9,853,870 B2* | 12/2017 | Pacella | H04L 41/5054 |
| 2001/0003202 A1 | 6/2001 | Mache | |
| 2001/0003203 A1 | 6/2001 | Mache | |
| 2002/0075846 A1 | 6/2002 | Valentine et al. | |
| 2002/0087634 A1 | 7/2002 | Ogle et al. | |
| 2002/0110104 A1 | 8/2002 | Surdila et al. | |
| 2002/0120697 A1 | 8/2002 | Generous et al. | |
| 2003/0023691 A1 | 1/2003 | Knauerhase | |
| 2003/0058478 A1 | 3/2003 | Aoki | |
| 2003/0063590 A1 | 4/2003 | Mohan et al. | |
| 2003/0123432 A1 | 7/2003 | Cheng et al. | |
| 2003/0128691 A1 | 7/2003 | Bergman et al. | |
| 2003/0131132 A1 | 7/2003 | Cheng et al. | |
| 2003/0142795 A1 | 7/2003 | Gavette et al. | |
| 2003/0219104 A1 | 11/2003 | Malik | |
| 2003/0219109 A1 | 11/2003 | Malik | |
| 2004/0019695 A1 | 1/2004 | Fellenstein et al. | |
| 2004/0199649 A1 | 10/2004 | Tarnanen et al. | |
| 2004/0240087 A1 | 12/2004 | Matsushima et al. | |
| 2004/0254998 A1 | 12/2004 | Horvitz et al. | |
| 2005/0052996 A1 | 3/2005 | Houck et al. | |
| 2005/0083909 A1 | 4/2005 | Kuusinen et al. | |
| 2005/0114533 A1 | 5/2005 | Hullfish et al. | |
| 2005/0265325 A1 | 12/2005 | Tsai | |
| 2005/0271018 A1 | 12/2005 | Liu et al. | |
| 2006/0018291 A1* | 1/2006 | Patel | H04L 63/0407 370/335 |
| 2006/0187898 A1 | 8/2006 | Chou et al. | |
| 2006/0245573 A1 | 11/2006 | Sheth et al. | |
| 2007/0047402 A1 | 3/2007 | Chen et al. | |
| 2007/0153991 A1 | 7/2007 | Daigle | |
| 2007/0253348 A1 | 11/2007 | Sammarco | |
| 2007/0254695 A1 | 11/2007 | Langberg et al. | |
| 2008/0062253 A1 | 3/2008 | Jaspersohn et al. | |
| 2009/0010247 A1 | 1/2009 | Stille | |
| 2009/0077179 A1 | 3/2009 | Bi et al. | |
| 2009/0097408 A1 | 4/2009 | Corcoran | |
| 2009/0214018 A1 | 8/2009 | Tsai | |
| 2009/0232129 A1 | 9/2009 | Wong et al. | |
| 2009/0307364 A1* | 12/2009 | Shimakura | G06F 12/0802 709/230 |
| 2010/0017521 A1 | 1/2010 | Ying et al. | |
| 2010/0157851 A1 | 6/2010 | Farah | |
| 2010/0195641 A1 | 8/2010 | Tsai | |
| 2011/0002229 A1 | 1/2011 | Johns et al. | |
| 2011/0026488 A1* | 2/2011 | Patel | H04L 63/0407 370/331 |
| 2011/0065419 A1 | 3/2011 | Book et al. | |
| 2011/0096673 A1 | 4/2011 | Stevenson et al. | |
| 2011/0130124 A1 | 6/2011 | Nozaki et al. | |
| 2011/0216694 A1 | 9/2011 | Plasberg et al. | |
| 2011/0235605 A1* | 9/2011 | Yeoum | H04W 72/04 370/329 |
| 2012/0142341 A1 | 6/2012 | Nagpal et al. | |
| 2012/0213073 A1* | 8/2012 | Ang | H04W 28/085 370/235 |
| 2013/0163480 A1 | 6/2013 | Dye et al. | |
| 2014/0007200 A1* | 1/2014 | Zisimopoulos | H04L 63/102 726/4 |
| 2014/0112207 A1 | 4/2014 | Hinrikus et al. | |
| 2014/0323145 A1* | 10/2014 | Lam | H04W 68/02 455/456.1 |
| 2014/0364165 A1 | 12/2014 | Kim et al. | |
| 2014/0376360 A1 | 12/2014 | Lisak et al. | |
| 2015/0003411 A1 | 1/2015 | Sandhu et al. | |
| 2015/0063298 A1 | 3/2015 | Keller et al. | |
| 2015/0156660 A1* | 6/2015 | Luo | H04W 8/02 370/230 |
| 2015/0201363 A1 | 7/2015 | Lundqvist et al. | |
| 2016/0112469 A1 | 4/2016 | Liu | |
| 2017/0154010 A1* | 6/2017 | Ning | G06F 13/364 |
| 2017/0311247 A1* | 10/2017 | Qi | H04W 68/04 |
| 2018/0048558 A1* | 2/2018 | Lake | H04L 45/12 |
| 2018/0049072 A1* | 2/2018 | Youn | H04W 28/02 |

OTHER PUBLICATIONS

USPTO, Notice of Allowance for U.S. Appl. No. 14/477,807, dated Jan. 17, 2017, 17 pages.

USPTO, Final Office Action for U.S. Appl. No. 14/477,807, dated Oct. 20, 2016, 37 pages.

USPTO, First Action Interview, Pre-Interview Communication for U.S. Appl. No. 14/477,807, dated Dec. 31, 2015, 5 pages.

(56) References Cited

OTHER PUBLICATIONS

USPTO, First Action Interview Office Action Summary for U.S. Appl. No. 14/477,807, dated May 16, 2016, 7 pages.

* cited by examiner

SELECTION OF NETWORKS FOR VOICE CALL TRANSMISSION

CROSS REFERENCE TO RELATED APPLICATIONS

This application is a continuation of U.S. patent application Ser. No. 14/477,807, titled SELECTION OF NETWORKS FOR VOICE CALL TRANSMISSION and filed Sep. 4, 2014, the content of which is incorporated herein by reference.

BACKGROUND

The popularity and convenience of digital devices as well as the widespread of use of Internet communications have allowed users more choices in communicating with other users. For example, users can make voice calls over the traditional Public Switched Telephone Network (PSTN) using devices such as land-line telephones and cell phone voice plans and data plans. Many users can alternatively make calls over Internet data networks, e.g., using technologies such as Voice over IP (VOIP) and using a device able to communicate over the Internet, e.g., using wired connections or wireless communication with a hub or router using IEEE 802.11 standard communication (Wi-Fi®) or other communication protocols.

SUMMARY

Implementations of the present application relate to selection of networks for voice call transmission. In some implementations, a method includes determining a voice call for communication between a sending device initiating the voice call and a receiving device and determining one or more first characteristics of the voice call. The method selects, based on the first characteristics of the voice call, one of a phone network and a data network to use to route data of the voice call from the sending device to an intermediary server on the data network. The method causes the data of the voice call to be sent to the intermediary server over the selected network. The data of the voice call is sent from the intermediary server to the receiving device on one of the phone network and the data network chosen by the intermediary server based on one or more second characteristics of the call.

Various implementations and examples of the method are described. For example, the receiving device can be associated with an intermediate phone number used as an address to the intermediary server, and calls from the sending device that are routed on the phone network use the intermediate phone number to route through the intermediary server. The intermediary server can address the call to the receiving device using a phone number of the receiving device in response to selecting the phone network and using a data address of the receiving device in response to selecting the data network. The method can further include determining to route the call from the sending device to the intermediary server on the phone network based on call characteristics of the sending device, where the intermediary server determines to route the call from the intermediary server to the receiving device on the data network based on call characteristics of the receiving device. For example, the phone network can include a Public Switched Telephone Network (PSTN) and the data network can include the Internet, where the call over the data network can use Voice Over IP (VOIP).

The method can further include, automatically and without user intervention, selecting a communication identity for calling the receiving device based on the selected network used between the sending device and the intermediary server, and/or based on the chosen network used between the intermediary server and the receiving device. The communication identity can be determined at the sending device and can be an intermediate phone number for the intermediary server in response to the selected network being the phone network, and the intermediary server, automatically and without user intervention, can select a second communication identity for the receiving device based on the chosen network used between the intermediary server and the receiving device.

The first characteristics can include a variety of different characteristics. For example, the first characteristics can include, at the time of initiation of the voice call, a presence of the sending device on the data network, and a presence of the receiving device on the data network. The first characteristics can include a signal strength between the sending device and a sending wireless network connected to the data network, and the second characteristics can include a signal strength between the receiving device and a receiving wireless network connected to the data network. The first characteristics can include a data bandwidth detected for the sending device on the data network, and a data bandwidth detected for the receiving device on the data network. The first and second characteristics can include a presence of a video display device at the sending device and at the receiving device, and the method can further comprise detecting the presence of the video display devices at the sending device and at the receiving device, and in response to this detection, causing the data of the voice call to include a video stream provided from a camera of the sending device for a video call. The first characteristics can include user preferences provided by a user of the sending device or a user of the receiving device, where the user preferences can include an indication of which network to use for calls output by the sending device under predetermined conditions. For example, the user preferences can include designated users allowed to call the receiving device at designated times. The first and second characteristics can include one or more functions or call processing capabilities of the receiving device. The first characteristics can include a cost to the user of the sending device of to connect the sending device and the receiving device for the voice call.

A method includes, in some implementations, receiving data of a voice call at an intermediary server for communication between a sending device that initiated the voice call and a receiving device. The data of the voice call is received from the sending device over one of a phone network and a data network selected by the sending device based on one or more first characteristics of the call. The method determines one or more second characteristics of the voice call and chooses, based on the second characteristics, one of the phone network and the data network to use to route data of the voice call from the intermediary server to the receiving device. The method causes the data of the voice call to be sent to the receiving device over the chosen network, including addressing the call to the receiving device using a phone number of the receiving device in response to choosing the phone network, and using a data address of the receiving device in response to choosing the data network. In some implementations, voice calls from the sending device that are routed on the phone network are addressed to an intermediate phone number connecting to the intermediary server, where the receiving device is associated with the intermediate phone number.

In some implementations, a system can include a storage device and at least one processor accessing the storage device and operative to perform operations. The operations include determining a voice call for communication between a sending device initiating the voice call and a receiving device, and determining one or more first characteristics of the voice call. Operations include selecting, based on the first characteristics of the voice call, one of a phone network and a data network to use to route data of the voice call from the sending device to an intermediary server on the data network. The operations include causing the data of the voice call to be sent to the intermediary server over the selected network. The data of the voice call is sent from the intermediary server to the receiving device on one of the phone network and the data network chosen by the intermediary server based on one or more second characteristics of the call. In some implementations, the receiving device can be associated with an intermediate phone number used as an address to the intermediary server, and calls from the sending device that are routed on the phone network can use the intermediate phone number to route through the intermediary server. The intermediary server can address the call to the receiving device using a phone number of the receiving device in response to selecting the phone network and using a data address of the receiving device in response to selecting the data network.

DETAILED DESCRIPTION

Figure 1:
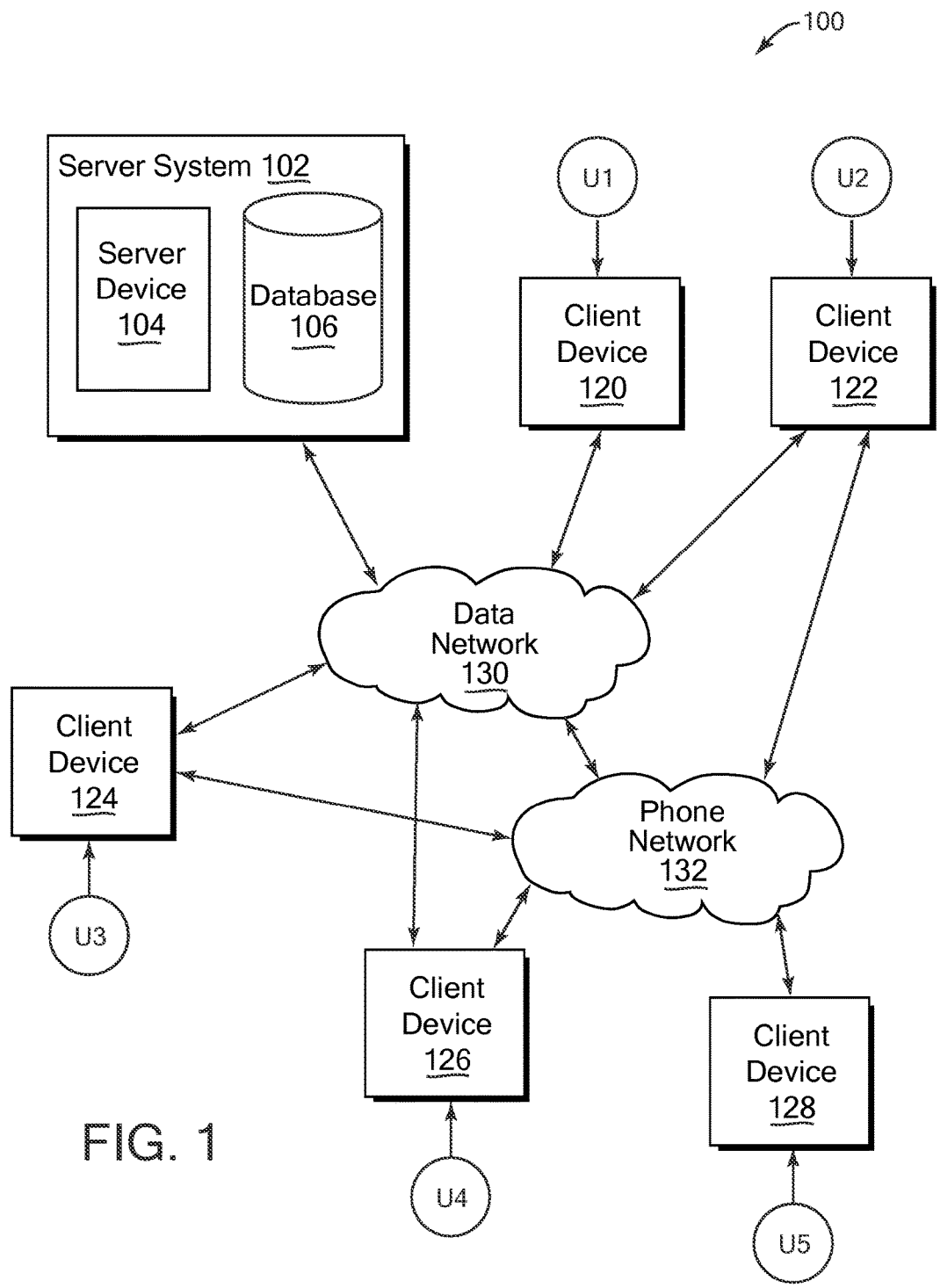
FIG. 1 is a block diagram of an example network environment which may be used for one or more implementations described herein.

One or more implementations described herein relate to selection of networks for voice call transmission. In some examples, a system determines that a voice call is to be initiated for communication between a sending device initiating the voice call and a receiving device. The system determines one or more first characteristics of the voice call and selects, based on the first characteristics, a phone network or a data network to use to route data of the voice call from the sending device to an intermediary server on the data network. The system causes the data of the voice call to be sent to the intermediary server over the selected network. Furthermore, the data of the voice call is sent from the intermediary server to the receiving device on the phone network or the data network as chosen by the intermediary server based on one or more second characteristics of the call.

These and other described features can allow automatic and convenient selection of communication networks for a voice call based on various criteria of importance to the user. For example, described features allow a system to evaluate and compare various characteristics provided by different networks available to the user to make the call, such as quality of the call, cost of the call, and upgradable options for the call on the various networks. For example, the system can automatically evaluate whether a call over a data network (e.g., using VOIP) can be made to the receiving user to reduce costs of the user and/or allow upgraded calls such as video calls and high-definition voice calls, and the system can automatically select and initiate such an option if possible and desirable. Furthermore, the sending device of the user can connect with an intermediary server that in turn connects with the receiving device. Such a configuration allows a user to, for example, call over a phone network to the intermediary server and have the intermediary server call the receiving device over a data network, or vice-versa. This can provide two stages to the call that can be independently evaluated, e.g., by the sending device and the intermediary server, respectively, to provide flexibility in determining the best overall network to use at each stage. The system can also automatically select the appropriate communication identity for the recipient of the call, such as phone number or data network address, based on the network(s) that have been selected for use to connect the call. This can provide abstraction of user identities from particular addresses used on particular mediums such as phone numbers for phone networks and network addresses for data networks. Further features include automatically upgrading a call to an enhanced type of call, such as high definition audio and/or video call, if conditions and preferences allow the upgrade.

For example, such features alleviate the efforts of users from having to manually try out different communication networks to find out which network works best for a particular call to a particular recipient, since the system can explore many of the available options at the time of the call and select a network based on current call conditions and preferences of the user. Thus, technical effects of features disclosed herein include a reduction in user time to initiate a voice call of desired quality and cost, thus saving a user time, energy, and resources. Another technical effect is an enhanced ability of the user to customize the conditions under which voice calls are initiated and accepted, further saving user time and attention.

FIG. 1 illustrates a block diagram of an example network environment 100, which may be used in some implementations described herein. In some implementations, network environment 100 includes one or more server systems, such as server system 102 in the example of FIG. 1. Server system 102 can include a server device 104 and a database 106 or other storage device.

Server system 102 can communicate directly with data network 130, in some examples. A "data network" as referred to herein, includes the Internet (e.g., Internet backbone) and other public packet-switched wide area networks, e.g., that can use protocols such as Internet Protocol (IP). Data network 130 can also include any connecting IP networks, such as local area networks (LANs) over Ethernet, and local wireless networks, such as wireless networks implemented with the IEEE 802.11 standards, also referred to as Wi-Fi® herein (or related packet-switched networks, such as Wi-Fi Direct®). The data network 130 can communicate with phone network 132. A "phone network," as referred to herein, includes one or more circuit-switched networks and other communication networks that are operated by phone service carriers, such as land-line telephone carriers, cellular service providers, etc. The phone network 132 includes the Public Switched Telephone Network (e.g., PSTN backbone) as well as connected private networks that access the PSTN and are operated by carriers or service providers, such as wireless cellular (cell phone) networks and wireless wide area networks used to provide voice and data communications to client devices.

For ease of illustration, FIG. 1 shows one block for server system 102, server device 104, and database 106. Server blocks 102, 104, and 106 may represent multiple systems, server devices, and network databases, and the blocks can be provided in different configurations than shown. For example, server system 102 can represent multiple server systems that can communicate with other server systems via the network 130. In another example, database 106 and/or other storage devices can be provided in server system block(s) that are separate from server device 104 and can communicate with server device 104 and other server systems via data network 130 and/or phone network 132.

Network environment 100 also can include one or more client devices, such as client devices 120, 122, 124, 126, and 128. There may be any number of client devices. Each client device can be any type of electronic device, such as a computer system, laptop computer, portable device, cell phone, smart phone, tablet computer, television, TV set top box or entertainment device, wearable devices (e.g., display glasses or goggles, wristwatch, etc.), personal digital assistant (PDA), media player, game device, etc. In other implementations, network environment 100 may not have all of the components shown and/or may have other elements including other types of elements instead of, or in addition to, those described herein.

Client devices 120-128 may communicate with each other via data network 130, phone network 132, and/or server system 102. Some client devices can communicate directly with data network 130, some client devices can communicate directly with phone network 132, and some client devices can communicate directly with both data network 130 and phone network 132. In the example of FIG. 1, client device 120 can be a device that can communicate with the data network (e.g., a desktop computer or tablet computer not having cellular capability), client devices 122-126 can communicate with the data network and the phone network (e.g., smartphones or other devices with cell phone and Wi-Fi capability), and client device 128 can communicate with the phone network (e.g., a traditional land-line telephone).

In various implementations, end-users U1, U2, U3, U4 and U5 may communicate with the server system 102 and/or each other using respective client devices 120, 122, 124, 126, and 128. In some examples, users U1-U4 may interact with each other via the data network 130, e.g., using VOIP and/or a social network service implemented on server system 102, where respective client devices 120, 122, 124, and 126 transmit communications and data to one or more server systems such as system 102, and the server system 102 provides appropriate data to the client devices such that each client device can receive content uploaded to the social network service via the server system 102. In some examples, a social network service or other service provided by server 102 can include any system allowing users to perform a variety of communications, form links and associations, participate in live video, audio, and/or text chat with other users of the service, upload and post shared content including text, images, video sequences, audio sequences or recordings, or other types of content for access by designated sets of users of the social network service, and/or perform other socially-related functions.

For example, the social network service can allow a user to send messages to particular or multiple other users, form social links in the form of associations to other users within the social network system, group other users in user groups, etc. A user can designate one or more user groups to allow users in the designated user groups to access or receive the user's posted content, profile information, and other information associated with the user on the social networking service. In some implementations, the access of users to user information can be designated in terms of larger groups, such as a "public" setting designating all the users of the social network service, "acquaintances" to indicate friends of friends, or a different privacy level setting. Some implementations of a social networking service allow the user to designate groups of users including extended or additional socially-linked levels (degrees of separation) of users (e.g., friends of the friends). A user may also be able to designate other groups or sets of users for access regardless of whether those other users are in the user's own groups. For example, the user may designate users belonging to a group or list, or having one or more specified characteristics, such as age, membership in a designated organization, eye color, designated hobbies or interests, member of a designated organization since a particular time or date, etc. Other network services or applications can also be implemented using the network environment 10 and used by users to communicate messages, content, and information with each other, e.g., photo collection services, web page forums, etc. Other implementations of features described herein can use any type of system and service. In some implementations, client devices can communicate with each other directly without using server system 102, e.g., in peer-to-peer communication.

Some client devices, such as client devices 122-128, can communicate with each other using phone network 132. For example, client devices 122-126 can select to directly connect to the phone network 132 instead of data network 130, e.g., via cellular radio or modem, or via a wired phone connection. Client device 128 can always connect to the phone network 132 and does not have an option to connect to data network 130.

A user interface can enable display of images and other content as well as communications, privacy settings, notifications, and other data on a client device 120, 122, 124, 126, and 128. Such an interface can be displayed using software on the client device, such as application software or client software in communication with the server system. The interface can be displayed on an output device of a client device, such as a display screen. Any type of electronic device can make use of features described herein. In some examples, a client device or server device having a display screen can display images and provide features and results as described herein that are viewable to a user.

Figure 2:
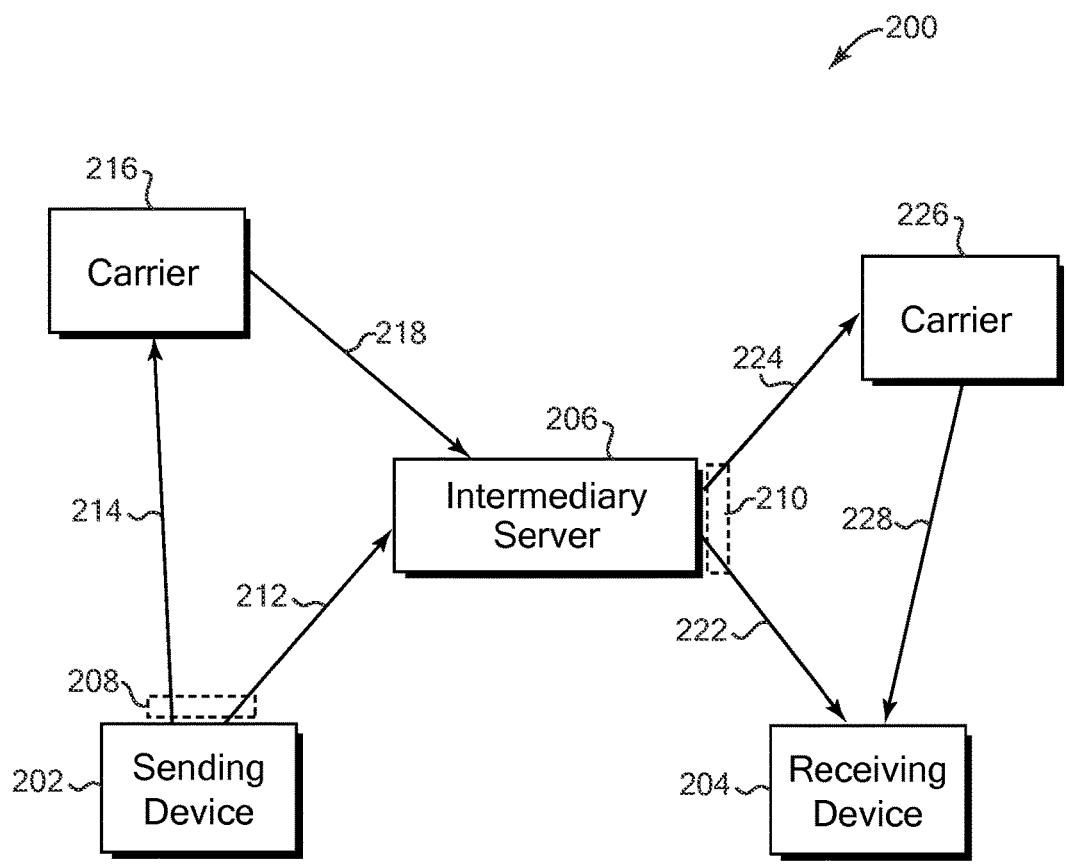
FIG. 2 is a block diagram of an example call system which may be used for implementing one or more features described herein.

FIG. 2 is a block diagram illustrating one example of a call system 200 that can be used for implementing one or more features described herein. Call system 200 includes a sending device 202, receiving device 204, and intermediary server 206. Various implementations can include additional devices similar to devices 202, 204, and 206 and interconnected similarly with each other.

Sending device 202 is used by a sending user to initiate a voice call to receiving device 204 that is being used by a receiving user. For example, sending device 202 and receiving device 204 can be client devices as described above with respect to FIG. 1, e.g., client devices 122-126 which can communicate over both the data network 130 and the phone network 132. The sending user can initiate a voice call on sending device 202 to allow the sending user to talk with the receiving user using receiving device 204. The sending user can initiate the call using an application, manipulating controls, and/or performing other actions on the sending device 202. For example, the sending user can select the receiving user from a list of contacts to call that are displayed by the sending device 202.

Features described herein can determine which communication network(s) to use to transmit the voice call from the sender to the recipient, such as determining the network to use at particular points or stages of the call in order to fulfill particular conditions of the sending user (and/or the receiving user in some implementations). The determination of networks can occur at points in the example of FIG. 2: at point 208, where it is decided which network to use in a first stage to connect from the sending device 202 to the intermediary server 206; and at point 210, where it is decided which network to use in a second stage to connect from the intermediary server 206 to the receiving device 204. It should be noted that either or both of the first stage and second stage can include one or more servers, switches, routers, or other network devices on the pathways shown. Furthermore, the intermediary server 206 can be implemented as one or more servers and/or other devices connected to each other via the data network and/or local networks.

For example, a controller at the sending device 202 (e.g., performing some or all of method 300 or 400 described below) can determine which one of a data network and a phone network to use to send out the call from the sending device. In the example of FIG. 2, the controller can decide which path to take at point 208, where one choice is the path 212 over the data network to the intermediary server 206 that is also directly connected to the data network. For example, the data network path 212 can include a wireless networking path (e.g., Wi-Fi), routers, switches, servers, and other pathways of the Internet. Another choice at point 208 is path 214 over the phone network to a carrier 216, and from the carrier 216 along a path 218 to the intermediary server 206. For example, the paths 214 and/or 218 can include one or more wireless cell phone voice networks, wireless cell phone data networks, and/or wired PSTN connections to connect to the carrier 216. The carrier 216 provides the call on path 218 to the intermediary server 206, and can cause the call to route onto the data network, e.g., using a gateway, bridge, etc. to connect to the intermediary server 206 on the data network. In some implementations, the carrier can provide intermediate phone numbers that are associated with the intermediary server 206 and with particular users and/or user devices, and these numbers can be used as addresses to the intermediary server. Thus, if the sending device 202 calls an intermediate phone number using the phone network, the call is routed over the phone network to the carrier and from the carrier to the data network and to the intermediary server 206. Some examples of the network selection for the sending device 202 are described below with respect to FIG. 4.

A controller implemented at the intermediary server 206 can determine which one of the data network and the phone network to use to send out the call from the intermediary server 206 and connect with the receiving device 204. In the example of FIG. 2, the controller at the intermediary server 206 can decide which path to take at point 210, where one choice is the path 222 over the data network to the receiving device 204 that can be directly connected to the data network. For example, the data network path 222 can include a wireless networking path (e.g., Wi-Fi), routers, switches, servers, and other pathways of the Internet. Another choice at point 210 is path 224 over the phone network to a carrier 226, and from the carrier 226 along a path 228 to the receiving device 204. For example, the path 224 can include routing the call from the data network of the intermediary server 206 to the phone network at the carrier 226, using a gateway, bridge, etc. The carrier 226 provides the call on phone network path 228 to the receiving device 204, where the path 228 can include a wireless cell phone voice network, wireless cell phone data network, and/or wired PSTN connections. In some implementations, if the intermediary server received a call that used an intermediate phone number from sending device 202, the intermediary server 206 can look up the phone number in accessible storage to find the user and/or device that corresponds to the called intermediate number, or the server can request the corresponding user or device from the sending device. The server can then specify the phone number of the found device (which is receiving device 204) in its call data sent to carrier 226, and the carrier 226 can call that phone number directly on path 228 to connect to receiving device 204. Some examples of the network selection by the intermediary server are described below with respect to FIG. 5.

Figure 3:
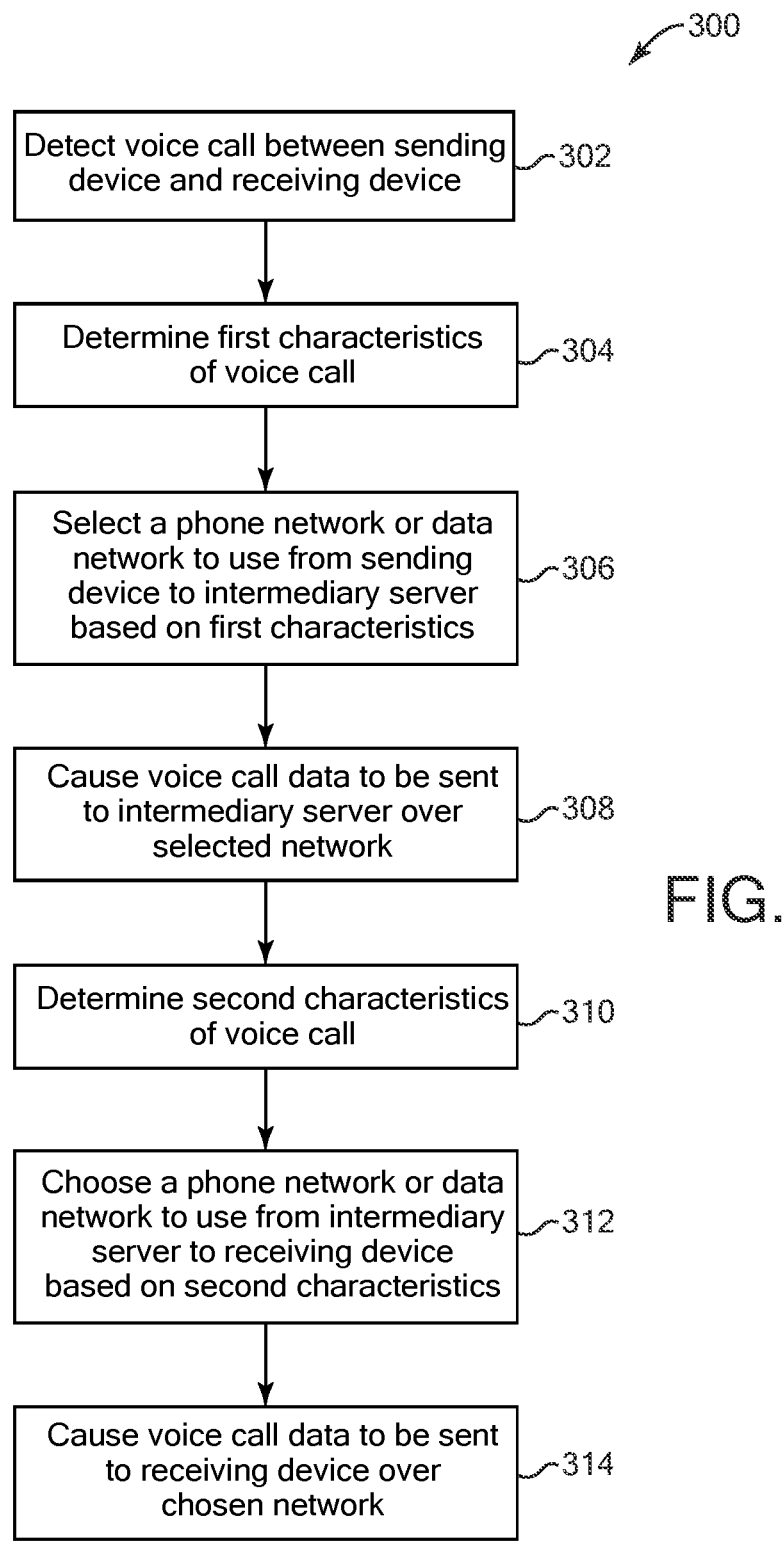
FIG. 3 is a flow diagram illustrating an example method for selecting networks for voice call transmission, according to some implementations.

FIG. 3 is a flow diagram illustrating one example of a method 300 for selecting one or more networks for voice call transmission. In some implementations, some or all of method 300 can be implemented, for example, on a client device that has the capability to communicate directly with data network 130 and phone network 132, e.g., any of client devices 122-126 as shown in FIG. 1. Some or all of the method 300 can be implemented on a system such as one or more server systems, and/or on both a server system and a client system. In the described implementations, a client device can be sending device that implements blocks 302-308, and a server device can be the intermediary server that implements blocks 310-314. In described examples, the implementing system includes one or more processors or processing circuitry, and one or more data storage devices for storing data, instructions, etc. In some implementations, different components of one or more servers and/or clients can perform different blocks or other parts of the method 300.

Method 300 can be implemented by computer program instructions or code, which can be executed on a computer, e.g., implemented by one or more processors, such as microprocessors, microcontrollers, or other processing circuitry and can be stored on a computer program product including a computer readable medium, such as a magnetic, optical, electromagnetic, or semiconductor storage medium, including semiconductor or solid state memory, magnetic tape, a removable computer diskette, a random access memory (RAM), a read-only memory (ROM), flash memory, a rigid magnetic disk, an optical disk, a solid-state memory drive, etc. The program instructions can also be contained in, and provided as, an electronic signal, for example in the form of software as a service (SaaS) delivered from a server (e.g., a distributed system and/or a cloud computing system). Alternatively, method 300 can be implemented in hardware (logic gates, etc.), or in a combination of hardware and software.

In block 302, the method detects a voice call to be made between a sending device and a receiving device. In some examples, the method 300 can be implemented by the sending device, and a user of the sending device can command initiation of the voice call. For example, the user may have opened a communication program or social networking interface on a cell phone or other device and selected a user as a recipient of the call in a graphical user interface displayed by the sending device, or performed a different command to initiate the call. The receiving user is associated with one or more devices, any of which can be considered the receiving device. In other implementations, the detected voice call may have been initiated automatically by a system. For example, the call can be initiated based on one or more predetermined events or conditions such as a user opening an application such as a communication application, detecting particular user actions, etc. In some implementations, such conditions can be specified by a user in custom preferences of the user.

In block 304, the method determines a first set of characteristics of the voice call. For example, the method can automatically and without user input or other intervention, check for one or more of the first characteristics that are present in the desired voice call. The characteristics can include characteristics determined by the sending device, e.g., for characteristics at the sending end of the call. In some implementations, the characteristics can be determined based on information requested and/or received from the intermediary server, the receiving device, and/or other devices. In various examples, the first characteristics can include characteristics relating to the sending device and/or to the receiving device, such as characteristics describing the current connection and network conditions related to the devices, characteristics related to costs of the call, characteristics related to quality of the call, characteristics related to capabilities of the devices in the call, preferences of the sending user and/or receiving user, and/or other characteristics related to the call. Some examples of determining first characteristics are described below with respect to FIG. 3.

In block 306, the method selects a phone network or a data network to use for the voice call on a path from the sending device to an intermediary server, where the selection is based on the first characteristics of the voice call. The voice call is either sent over a connected phone network or over a connected data network from the sending device to the intermediary server. In some implementations, the intermediary server can be similar to server system 102 and is connected to the data network, such that a data network path from the sending device is provided directly to the server over the data network, and a phone network path from the sending device switches to a data network path to connect to the intermediary server. For example, in some implementations the intermediary server can be associated with an intermediary phone number which the sending device can call over the phone network, where the intermediary phone number connects the sending device to the intermediary server, e.g., from the phone network to the data network via a gateway or bridge. Some examples of selecting a phone network or data network are described in greater detail below with respect to FIG. 3.

In block 308, the method causes data of the voice call to be sent to the intermediary server over the selected network. For example, the voice call can be initiated with a call request or other initiating data, and voice data recording and describing the voice of the user is sent over the selected network to the intermediary server. In some implementations, the call can be upgraded to a video call such that video data is also caused to be transmitted for the call, as described in greater detail below with respect to FIGS. 4 and 5.

In block 310, the method determines a second set of characteristics of the voice call. For example, the method can automatically and without user input or other intervention, check for one or more of the second characteristics that are present in the desired voice call. The second characteristics can be the same as the first characteristics in some implementations, or can be different, e.g., a subset of the first characteristics and/or including one or more different characteristics. For example, the second characteristics can include characteristics related to the receiving device, such as characteristics related to network connection and capabilities of the receiving device. The second set of characteristics can be determined by the intermediary server based on its knowledge of the sending device and the receiving device. In various examples, the second characteristics can include characteristics describing the current connection and network conditions related to the receiving device, characteristics related to costs of the call, characteristics related to quality of the call, characteristics related to capabilities of the receiving device, user preferences of the sending user and/or receiving user, and/or other characteristics related to the call. Some examples of determining second characteristics are described below with respect to FIG. 5.

In block 312, the method chooses a phone network or a data network to use for the voice call on a path from the intermediary server to the receiving device, where the selection is based on the second set of characteristics of the voice call. For example, in some implementations the intermediary server can perform this selection, where the voice call is either to be sent over the phone network or over the data network from the intermediary server to the receiving device. Some examples of choosing a phone network or a data network are described in greater detail below with respect to FIG. 5.

In block 314, the method causes data of the voice call to be sent from the intermediary server over the chosen network to the receiving device. For example, the voice call request and data can be sent to the receiving device directly over the data network, or the server can transmit a call request and voice call data over the phone network to the receiving device. For example, the intermediary server can be connected to the data network and either sends the call directly over the data network to a data-connected receiving device, or sends the call from the data network and over the phone network to a phone-connected receiving device, e.g., using a gateway or other bridging network component between the two networks. The receiving device receives the call request and voice call data and outputs appropriate data to a receiving user of the receiving device. Some examples of sending the call data from the intermediary server to the receiving device are described in greater detail below with respect to FIG. 5.

Voice call data sent in the opposite direction from the receiving device to the sending device during the same voice call can follow the same paths through the networks as selected by the sending device and the intermediary server for the call data sent from sending device to receiving device. Alternatively, the return voice call data can be sent on a different path through the networks with more emphasis on preferences of the receiving user instead of the sending user.

In other implementations, other types of communication networks besides the phone network and data network described herein can also be available (e.g., personal networks between devices, etc.), from which the method can also evaluate for selection based on call characteristics associated with those networks and the devices in the call, similar to the operations described herein.

Figure 4:
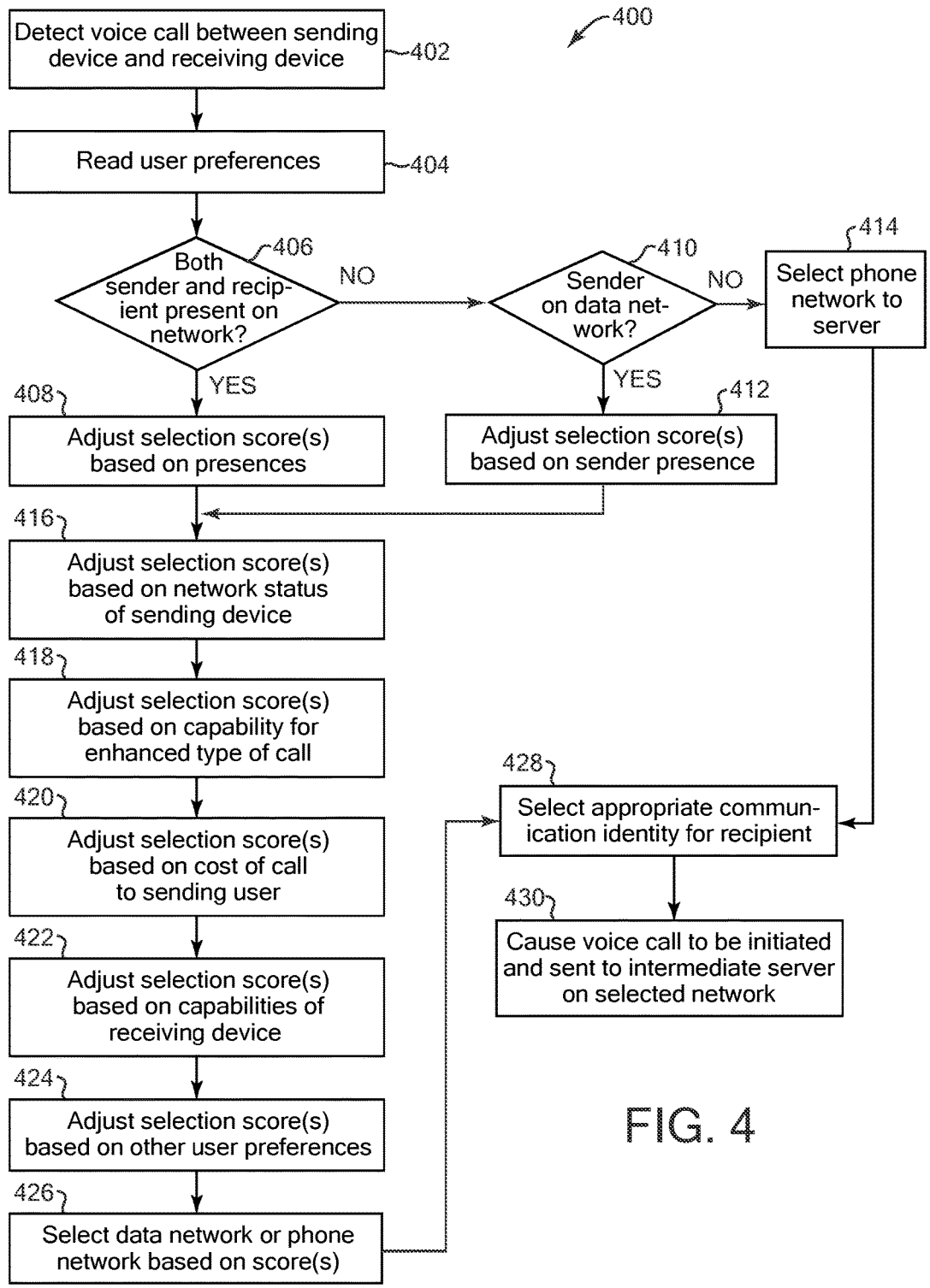
FIG. 4 is a flow diagram illustrating an example method implementing blocks of FIG. 3 in which the method causes a voice call to be sent from a sending device on a selected network, according to some implementations.

FIG. 4 is a flow diagram illustrating an example method 400 implementing blocks 302 to 308 of FIG. 3, in which the method causes a voice call to be sent on a selected network from a sending device, according to some implementations. In this example, method 400 can be implemented by a sending device 202, or other system that is or includes a client device as described above. For example, method 400 can be automatically implemented on the sending user's sending device in response to appropriate conditions as described below.

In block 402 the method detects a voice call between the sending device and a receiving device. For example, as described above for block 302, the method can detect the initiation of the voice call by the sending user using the sending device 202. A receiving user and/or receiving device is indicated by the initiation of the call as the recipient of the call. For example, the sending user can select a name or otherwise indicate a receiving user for the call, and the address of the receiving device can be determined from that selection, e.g., a stored phone number, Internet address, or other address associated with the selected recipient.

In block 404, the method reads user preferences that relate to voice calls. A variety of user preferences can be stored and modified by the sending user as desired. For example, user preferences can indicate the importance of various characteristics of a call to the user, such as the quality of a voice call to the user (e.g., clarity of conveyed speech, minimal pauses, timeouts, or other interruptions, reduced interference, etc., as well as the ability to upgrade to a higher quality type of call such as a high-definition voice call) and the monetary cost of a voice call to the user. More detailed preferences can indicate how much the user is willing to spend on a voice call to specified users, e.g., the user is willing to pay a higher cost for a call to parents than for a call to particular friends, and the maximum or threshold costs can be set by the user. In some examples, the user can specify in preferences that costs above a user-defined threshold will prevent that call from being placed, or can indicate that a call can still be placed above the threshold cost under particular specified conditions.

In some implementations, user preference conditions can be based on the characteristics of the sending device at the time of the call, such as current geographical location, power remaining in the device battery, whether the user is performing other tasks, etc. Conditions can also be based on the user's calendar available on the sending device (or available from a connected server), such as particular events, meetings, identities of persons visited, etc. For example, a user preference can specify that phone-network calls are not desired unless made during particular types of events such as holidays, or particular events the user has designated in his or her calendar data. Preferences can also indicate particular call settings for particular other users called by the sending user and specify the conditions under which those call settings apply. For example, the user can set increased preference to use the phone network when calling user A at a particular time of day, day of week, and/or day of the year, while the user can set a decreased preference to use the phone network when calling user B for other conditions (time, event, etc.). Other user preferences can specify desired settings when receiving a call, as described in greater detail below with respect to FIG. 5. In some implementations, user preferences of the receiving user can also be obtained (e.g., from the intermediary server or receiving device) and examined for applicability, similarly as described below for FIG. 5.

In example implementations, each evaluated path from the sending device to the intermediary server can be associated with a network selection score, and these scores can be used indicate which network to select for the outbound voice call from the sending device to the intermediary server. For example, a data network selection score indicates the desirability of selecting the data network, while a phone network selection score indicates the desirability of selecting the phone network. Various characteristics are described in method 400 to adjust these scores up or down based on current conditions of the call, user preferences, and other call characteristics. For example, the method can adjust a selection score associated with the data network to indicate increased desirability of the data network, e.g., increase the score. In one example, the higher the data network selection score, the greater the desirability of using the data network to send out the voice call. In some cases in which a network must be eliminated from possibility due to existing characteristics or conditions, the associated score can be adjusted to the most extreme value to indicate that it cannot be selected at all regardless of other present call characteristics.

In other implementations, different types of scores or other measures can be used. For example, a single score can be used, where the magnitude of the score can indicate desirability of one network vs. the other network (e.g., positive magnitudes for one network, negative magnitudes for the other network). In another example alternative implementation, each call characteristic can be assigned its own individual score, and these individual scores can be combined to determine an overall score for the call or for each available network. Some implementations can also maintain a separate network score for using a data plan of a phone network (e.g., a cell phone network) to provide the voice call, e.g., using VOIP. Since the cost, network presence and status, quality, and other call characteristics can vary between a standard voice phone call and a data plan call over a phone network, the data plan voice call can be evaluated separately in such implementations similarly to the described data network and phone network.

In block 406, the method checks whether both the sender and the recipient are present on the data network, e.g., whether both the sending device and receiving device are actively connected to the data network and able to transmit and receive on the data network. The presence of the sending device can be determined by checking the active connections of the sending device, e.g., checking whether the sending device has a wireless networking (e.g., Wi-Fi) signal or is connected by wired connection to a network that allows Internet access. The presence of the receiving device can be determined by checking one or more Internet addresses associated with the receiving user or receiving device, e.g., via pinging and/or other network commands. In some implementations, the intermediary server can provide information to the sending device that indicates whether the receiving device is present on the data network (if the sending device is connected to the data network and can receive such information). In some implementations, the presence of the receiving user can also be dependent on whether the receiving user has been active on the receiving device with a predetermined period of time before the time of initiating the call, e.g., as detected by monitoring input from the receiving user via input devices, or using other sensor data provided from sensors on the receiving device, indicating use of the receiving device and/or physical presence of the receiving user at the receiving device within the period of time.

If both the sending device and receiving device are present on the data network, then the method continues to block 408, in which the method adjusts one or more selection score(s) associated with the data network and/or the phone network based on both presences. For example, the method can increase the selection score for the data network to indicate increased desirability to use the data network when both devices are present, e.g., because of the possibility of advantages such as reduced cost and options for a high quality type of call and/or video type of call (evaluated individually below). The method then continues to block 416, described below.

If the sending device and receiving device are not both present on the data network at block 406, then the method continues to block 410, in which the method checks whether the sending device is present on the data network (and the recipient is not present). If so, the method continues to block 412, in which the method adjusts the selection score(s) based on sender presence to indicate increased desirability of the data network, e.g., increases the data network selection score. In some implementations, the data network score is not increased as much in block 412 as in block 408. For example, if both sender and recipient are connected to the data network, other features may be enabled as described below (e.g., less costs, upgraded types of call available, etc.), thus increasing the desirability and score associated with that configuration. The method then continues to block 416, described below.

If the sending device is not present on the data network as checked in block 410, then the method continues to block 414 in which the method selects the phone network to use from the sending device to the intermediary server. Since the data network is not available to the sending device, the phone network is the only choice in such a case. For example, the sending device may be out of range of a wireless network, such that only the phone network is available to the device. The method then continues to block 428, described below.

In block 416, the method adjusts the selection score(s) associated with using the data network and/or the phone network based on the network status of the sending device with respect to the networks. Such network status can be determined based on characteristics such as current data bandwidth and/or latency of the connection of the sending device to a network, and thus can be related to the overall communication quality achievable during the call, such as clarity of conveyed speech, minimal pauses, timeouts, or other interruptions, etc. For example, the sending device may have a variable bandwidth connection based on current network activity or other variables. Other network status characteristics can include wireless signal strength if the sending device is connecting to a network via a wireless network. For example, the sending device can wirelessly connect over an available wireless network (such as Wi-Fi) connected to a router or other device that is connected to the data network. Similarly, a cell phone wireless network available to the sending device can be used to connect the sending device to the phone network (or to the data network via a cell phone data network or data plan network). If both the sending device and the receiving device are present on the data network, then network status characteristics of the receiving device can also be evaluated if possible, e.g., by testing the connection via pings or other packet techniques, and/or receiving information from the intermediary server which may have information regarding the current receiving device connection.

In one example, the sending device may be evaluated to have a good connection (e.g., higher wireless signal strength) to the data network with high bandwidth and low latency as compared to known attainable ranges, in which case the data network selection score can be increased to indicate higher desirability of using the data network. In another example, the sending device may have a poor connection to the data network with a low bandwidth, high latency, and/or intermittent or low signal strength for connecting to a wireless network, in which case the data network score can be decreased to indicate lower desirability of using the data network. In some implementations, the phone network score can be adjusted in the opposite direction in addition to, or instead of, the data network score being adjusted. Scores can be adjusted analogously for phone network bandwidth, latency, and/or signal strength.

In block 418, the method adjusts the selection score(s) based on whether an enhanced type of voice call can be made to the receiving device. In some examples, the enhanced type of call can be a higher quality type of data voice call, such as a high-definition voice call (e.g., HD voice or wideband audio) that provides higher fidelity and clearer sound than is possible over the standard phone network, but which requires higher bandwidth connection to the data network for both the sending device and the receiving device. In some other examples, the enhanced type of voice call can be a video type of call that includes, alongside audio data, video data for presenting images and/or video streams captured by cameras connected to the sending and receiving devices. The video call can, in some implementations, also require a minimum bandwidth connection to the data network for both sending device and receiving device and other the conditions allowing a sufficient minimum quality of the video call (e.g., sufficient network bandwidth, processing capability, etc. at both sending device and receiving device). Furthermore, the data bandwidth requirements and/or other requirements for a higher-quality audio type of call can be different than the requirements for a video type of call. In addition, a video type of call requires a video display output device to be present at the sending device and/or the receiving device (or alternatively, at both the sending device and receiving device). Some enhanced types of calls can include both higher quality audio and video types of data.

The method can check whether the sending device and the receiving device have data network connections and/or other requirements that allow one or more types of an enhanced type of call to be made. In some implementations, the intermediary server can send information to the sending device indicating characteristics of the receiving device, such as whether the receiving device has a video display device, sufficient bandwidth, etc. If an enhanced call can be made, the data network selection score can be increased to indicate greater desirability of using the data network for such an enhanced call. If one or more types of an enhanced type of call are not possible or would not have sufficient usability under the current data network conditions, then the data network score can be decreased and/or the phone network score can be increased to indicate less desirability of the data network. Such score adjustments can also be influenced by the sending user preferences, which may indicate whether or not high quality type of calls and/or video type of calls are important to the sending user. For example, if the sending user greatly prefers higher-quality type of calls, then an inability to provide a higher-quality type of call for the current call can decrease the data network selection score by a greater amount than for a user who does not have any such preferences for a higher-quality type of call.

In block 420, the method adjusts the selection score(s) based on the cost of the call to the sending user. For example, the method can determine the cost for each path way to the intermediary server 206 and compare these costs. In some implementations, the cost over the data network is free or not tracked on a per-call basis, and so the data network path can be generally favored over the phone network path. In contrast, the phone network path may have a cell phone service charge from a cell phone service carrier, land-line service provider, or other provider or carrier. In some implementations, the intermediary server can provide an intermediate phone number to call in place of calling the direct phone number of the receiving device, and calling this intermediate phone number may be lower cost to the sending user (e.g., a local phone number). Furthermore, in some implementations, the method can take into account the path from the intermediary server to the receiving device in evaluating different costs of different paths in block 420. For example, a data network call to the intermediary server may be free and a data network call to the receiving device may also be free, but a call from the intermediary server to the receiving device over the phone network may require paying a fee. This information can be taken into account in evaluating the pathways.

The method can adjust the selection score for greater desirability (e.g., higher) for the network that has the lower cost path. In addition, the method can take into account user preferences in adjusting the scores. For example, if cost is of high importance to the user, then a larger adjustment to the network selection score having the lower cost can be made. Weighting can be added to the score adjustment based on user preferences, e.g., a zero or free cost can be weighted heavily in the score if the user has provided preferences indicating that free calls are favored by a large margin over paying any amount of money. Similarly, costs over a predetermined user-specified threshold cost can be weighted more in a negative (undesirability) direction. In some implementations, both scores can be adjusted based on the cost, e.g., by a value proportional to the associated cost of calling on that network.

In block 422, the method adjusts the selection score(s) based on one or more capabilities of the receiving device. For example, the method 400 at sending device 202 can obtain information describing the characteristics of the receiving device, e.g., from the intermediary server, from data storage written the last time that receiving device was called, or from some other available and connected source of such data. Such receiving device characteristics can include its processing capability (e.g., speed and processing capability of microprocessor and/or other processors on the receiving device), memory and/or other data storage capability, networking capability (e.g., protocols, networking speeds supported), display capabilities (refresh speeds, resolution, etc.), and/or other characteristics. In some implementations, knowledge of such characteristics can help determine whether a particular network can be used. For example, a particular type of call (e.g., higher quality) may require a particular amount of processing capability and/or data storage to be output satisfactorily to the receiving user. This block can also include checking for video output devices at sending and receiving devices to allow a video call, if not already performed in block 418. If the method finds reduced capabilities on the receiving device which will provide a poorer quality call over the data network, then the selection score the data network can be adjusted to indicate less desirability to select the data network, especially if the user has indicated in preferences that voice quality and high-quality types of calls are desirable. In other implementations, this determination of receiving device capability can be omitted in method 400 and determined for the second stage of the call path described below with reference to FIG. 5. In some implementations, such device capabilities can be determined for the sending device 202 to similarly adjust selection score(s).

In block 424, the method adjusts the selection score(s) based on other user preferences that have not been taken into account in the blocks described above. For example, the sending caller may have particular preferences relating to particular predetermined characteristics such as the time that the call is made, the geographic location from which the call is made, the particular receiving user (or receiving device) for the call, events or activities being performed by the user and/or by the sending device at the time of the call, interactions with other users, etc. The method can check user preferences and detect current characteristics to determine whether preferences apply. For example, the method can determine current user activities and events based on user calendar information (e.g., describing events taking place), sensed motion of a portable device (e.g., using accelerometers and/or gyroscopes in the sending device or other device), detected location (e.g., using GPS sensors in the sending device or other device), examining user content (messages to other users, messages received from other users, etc.), etc. Any such activity analysis can be made subject to user permission to allow the examination and analysis, in some implementations. The detected characteristics can be examined in view of the user preferences to determine which network is more desirable to be used by the sending user based on the current characteristics, and the method can adjust the score(s) of the data and phone networks in accordance with such determinations. For example, the user preferences may indicate that calls should only be made via the phone network after a specified hour of the day and when the user is not engaged in exercise; these characteristics can be determined by the method to influence the selection scores for the network.

In block 426, the method selects one of the data network and the phone network to use for transmitting the voice call from the sending device to the intermediary server. For example, the method can examine the selection scores for the data network and phone network, and select the network having the score indicating greater desirability for use with the voice call. For example, in some implementations, the higher score indicates the network having greater desirability. Other implementations can use scores as a guide, but can also take into account other factors or characteristics relating to the call which may not have been examined.

In block 428, the method selects an appropriate communication identity (e.g., address to use for the call) for the receiving device. The method can perform this selection automatically, e.g., without user intervention in the selection process. For example, if the method has selected the data network in block 426 and the receiving device is known to be present on the data network and the receiving user is "online" (e.g., determined in blocks 406 and 410), then the method selects an IP address, email address, social networking ID, or other data network address associated with the receiving user and for use on the data network. If the method has determined that the receiving user is not connected to the data network, then the method can select a phone number for the receiving user as the address for use over the phone network.

If the method has selected the phone network for use between sending device and intermediary server, then the method can select an intermediate phone number associated with the intermediary server and the receiving user as the communication identity. This allows the sending device to use the phone network to call the intermediary server. This intermediate number can be stored on the sending device for the receiving user or receiving device. In some implementations, the intermediate number can be retrieved from the intermediary server at the time that block 428 is performed, or at a previous time. For example, the sending device can previously retrieve in one data transaction all the intermediate phone numbers associated with user contacts stored on the sending device or in the sending user's account, e.g., during any previous connection between the sending device and the intermediary server. This allows the intermediate phone numbers to be available locally to the sending device for all stored user contacts, e.g., in case a data network connection is not possible at the time of the call and the intermediate phone number cannot be retrieved from the intermediary server at the time of the call. The intermediary server can store (and/or be sent) the receiving user's address information so that it can determine which address to use depending on the network selection for use in the second stage of the voice call from the intermediary server to the receiving device, as described below.

In block 430, the method causes the voice call to be initiated on the sending device and sent to the intermediary server on the selected network in the first stage of the call. For example, as described above, if the data network was selected, the call can be sent over the data network directly to the intermediary server, or if the phone network was selected, the call can be sent over a selected phone network to be transferred to the data network and received at the intermediary server. The intermediary server sends the call to the receiving device on the second stage of the call, examples of which are described below with reference to FIG. 5.

In some cases, an upgrade to a video call (if conditions allow it) can be found to be desirable by the method 400, e.g., based on user preferences and call conditions as described in block 418. For example, in block 430 a video stream of information based on images captured by a camera at the sending device can be readied and/or caused to be sent along with the audio stream of data encoding the sending user's voice, as well as information allowing the synchronization of these two streams in the output at the receiving device. In some implementations, the upgrade to a video call must be confirmed by the receiving device before the sending device sends out any video data from the sending device, as described below. In other implementations, the sending device can send the video data in block 430 regardless of recipient selections or preferences (e.g., allowing the possibility of a one-way video call in which, e.g., the receiving device receives and can display video data from the sending device but the sending device does not receive video data from the receiving device).

Some implementations can automatically initiate the call in block 430 without user intervention, thus promoting user convenience. In other implementations, or based on user preferences, the method can prompt or request the sending user for confirmation before causing the call to be initiated. For example, a prompt can be displayed on a display screen of the sending device that indicates to the user which network is selected for use. Some implementations can display information that led to the selection of the network and/or non-selection of the other network, and which may be of importance to the user based on user preferences, such as the cost of the selected/unselected network, the features allowed by the selected network (e.g., high definition audio, video call, etc.), current conditions relating to the sending device, receiving device, etc. In addition, some implementations can display options for the user to switch networks and use the other network, if possible. After the user provides confirmation of the network selection, the voice call is initiated. In some implementations, the user can provide input that causes the call to be cancelled or allows the user to make changes to the call, such as options to route the call on the data network or the phone network as desired. Some implementations can also display additional selection options for the user. For example, an additional option can cause the call to use a cell phone data plan offered by a carrier and which is available to the user on the sending device, and which can use a data protocol such as IP, e.g., VOIP over a cell data network (included in the phone network). Such a data service may have different network conditions (available bandwidth, etc.) and different costs than the voice service used on the phone network.

In some implementations, the sending device may not know some call characteristics such as the entire cost of the call if the intermediary server 206 makes the decision as to which network to use for the second path to the receiving device, and so the sending device can present estimations or approximations to the user. Some implementations can allow the sending device to request and receive such information from the intermediary server before the call is initiated from the sending device, e.g., request that the intermediary server decide which network to use for the second path before any call is actually initiated from the sending device.

Figure 5:
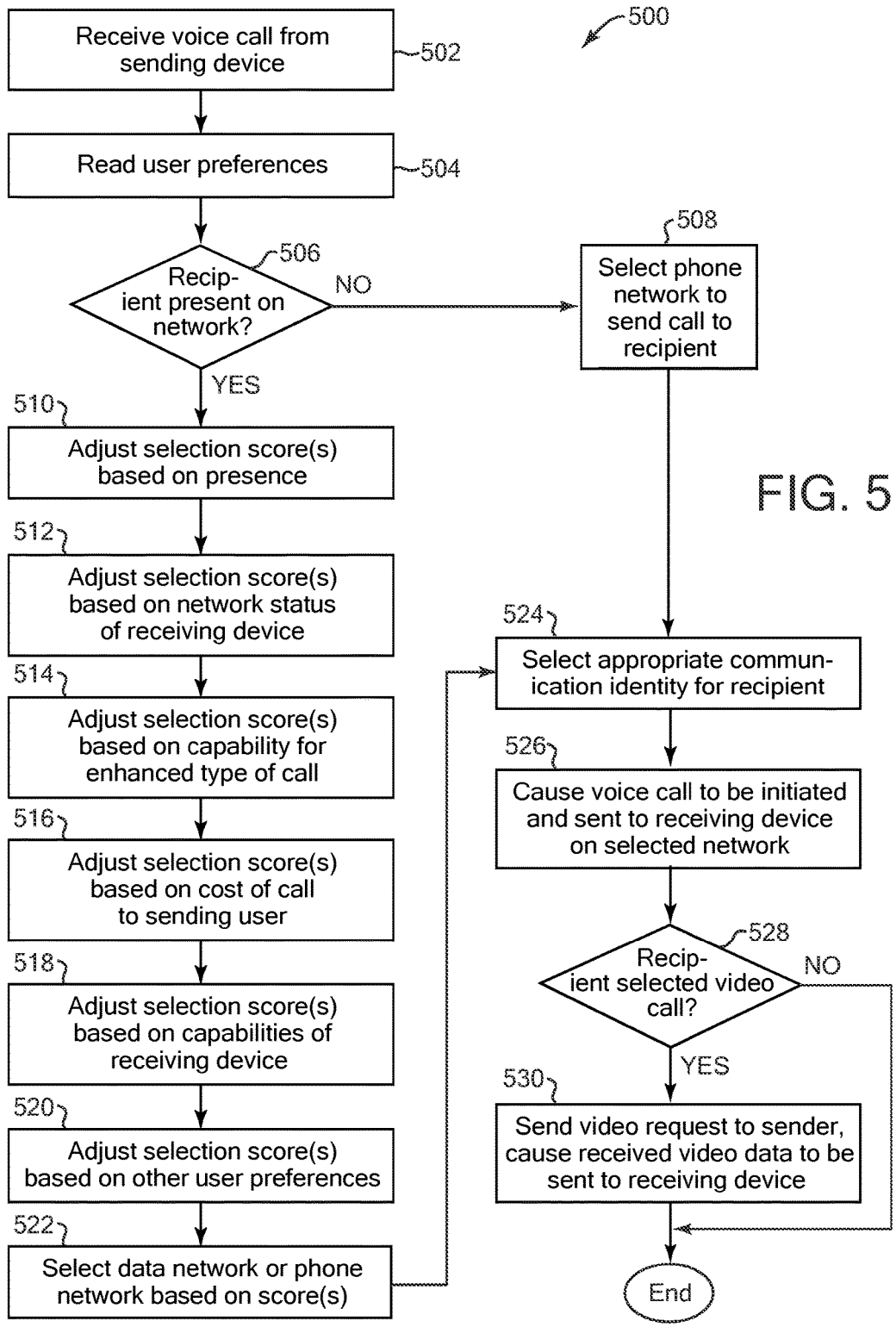
FIG. 5 is a flow diagram illustrating an example method implementing blocks of FIG. 3 in which the method causes a voice call to be sent on a selected network from an intermediary device to the receiving device, according to some implementations.

FIG. 5 is a flow diagram illustrating an example method 500 implementing blocks 310 to 314 of FIG. 3, in which the method causes a voice call to be sent on a selected network from an intermediary device to the receiving device, according to some implementations. In this example, method 500 can be implemented by an intermediary server 206 or other device connected to the data network, or other system that is or includes a server device as described above. For example, method 500 can be automatically implemented on the intermediary server device in response to receiving a voice call from the sending device as described above with reference to FIGS. 3 and 4.

In block 502, the method determines that a voice call has been received from the sending device 202 described above. For example, the voice call can be received by the intermediary server directly over the data network as voice data and other data describing the call. In other cases, the voice call can be received by the intermediary server over the phone network by the sending device calling an intermediate phone number that connects with the intermediary server, where the call is provided as digital data to the intermediary server on the data network (or some other data network in communication with the phone network). In some implementations, the received voice call can include a name, data network address, phone number, identifier, or otherwise indicate a receiving user for the call (e.g., in a call request), and in some cases the intermediary server can determine the address of the receiving device from that information. If the call has been upgraded to a video call as described above in FIG. 4, then a video data stream can also be received, which corresponds to the voice data stream of the received voice call.

In block 504, the method reads user reads user preferences that relate to voice calls. For example, the server can read preferences of the sending user, which in some implementations can be stored in association with a user identification for the sending user and which is accessible to the intermediary server, or can be sent to the intermediary server from the sending device. A variety of user preferences can be stored as described above with reference to block 404. For method 500, some of the more relevant user preferences can relate to the receiving device, such as preferences dependent on who the receiving user is, the capabilities of the receiving device, cost to route the voice call to the receiving device, etc.

In some implementations, user preferences of the receiving user can also be obtained and examined. For example, the receiving user may have provided a list of which users are allowed to call the receiving user under predetermined conditions specified by the receiving user. For example, the receiving user can specify that his or her phone will ring with a received call only for particular users who call within a specified time range of any day, or who call on specified days, while other users' calls are forwarded to the receiving user's voice mail, email, or other storage. In some implementations, the receiving user can also specify other conditions that may allow a call to get through to the receiving device, such as particular activities the receiving user may be doing (or not doing) at the time of the call, particular events that may be occurring (e.g., as determined from examining the receiving user's calendar information sent to the intermediary server from the receiving device at some previous point in time), or conditions of the current call connection of the receiving device and/or the sending device (e.g., a minimum bandwidth is present, both sender and caller are present on the data network, cost thresholds if the receiving user is to be charged, etc.). Such preferences can be similar to those described above for the sending user, for example.

In block 506, the method checks whether a presence of the receiving device is detected on the data network, e.g., whether the receiving device is actively connected to the data network and able to transmit and receive on the data network, e.g., the receiving user is "online" for the data network. The presence of the receiving device can be determined by checking one or more Internet addresses associated with the receiving user, e.g., via pinging and/or other packet techniques or network commands. In some implementations, block 506 may not be necessary if the receiving device presence was already previously detected in method 400 as described above.

If the receiving device is not present on the data network as checked at block 506, then the method continues to block 508, in which the method selects the phone network to use from the intermediary server to the receiving device. In this example, since the data network is not available to the receiving device, the phone network is the only choice (assuming that the phone network is available). For example, the receiving device may be out of range of a wireless network that connects to the data network, such that only the phone network is available to the receiving device. The method then continues to block 524, described below.

Method 500 can include various checks of call characteristics and corresponding adjustment of network selection scores in blocks 510-520 similarly to blocks 408-424 of FIG. 4. As described above, in some examples, each path from the intermediary server to the receiving device can be associated with a network selection score to indicate which network to select for the outbound voice call from the sending device to the intermediary server. In other implementations, different scores or other measures can be used, similarly as described above for FIG. 4.

If the receiving device is present on the data network as checked in block 506, then the method continues to block 510, in which the method adjusts the selection score(s) associated with the data network and/or the phone network based on this presence. For example, the method can adjust a selection score associated with the data network to indicate increased desirability of the data network, e.g., increase the score.

In block 512, the method adjusts the selection score(s) associated with using the data network and/or the phone network based on the network status of the receiving device with respect to the data network. Such network status can be determined based on characteristics such as current data bandwidth, latency, and/or wireless signal strength at the receiving device (e.g., wireless signal strength can be examined if the receiving device is connected via a wireless network at the receiving end of the path). For example, the receiving device may have a good connection to the data network with high bandwidth and low latency, in which case the data network selection score can be increased to indicate higher desirability of using the data network. In another example, the receiving device may have a poor connection to the data network with a low bandwidth, high latency, and/or intermittent or low signal strength for a wireless signal, in which case the data network score can be decreased to indicate lower desirability of using the data network.

In block 514, the method adjusts the selection score(s) based on capability for enhanced type of call, e.g., whether a higher quality type of voice call can be made to the receiving device, such as a high-definition audio call, and/or whether a video call can be made, as described above. The method can check whether the receiving device has a data network connection allowing such an enhanced type of call (e.g., if such a connection was not checked in the method of FIG. 4 or results provided to the intermediary server), and/or whether the receiving device has a capable video display component for video calls, e.g., similarly as block 418. If enhanced call capability is present for one or more types of enhanced calls, the data network score can be increased to indicate greater desirability of using the data network. If one or more of such enhanced types of calls are not possible or do not have sufficient usability under the current conditions, then the data network score can be decreased and/or the phone network score can be increased to indicate less desirability of the data network. Such score adjustments can also be influenced by the user preferences of the sending user as described above for FIG. 4.

In block 516, the method adjusts the selection score(s) based on the cost of the call to the sending user. For example, the method can determine the cost for each pathway to the receiving device 204 from the intermediary server 206. In some implementations, the cost over the data network is free or not tracked on a per-call basis, and so the data network path can be generally favored over the phone network path, similarly as described above for block 420. The method can adjust the selection score to indicate greater desirability (e.g., higher) for the network that has the lower cost path. In addition, the method can take into account user preferences in adjusting the scores and/or include other variations similarly as described above for block 420.

In block 518, the method adjusts the selection score(s) based on one or more capabilities of the receiving device. For example, the intermediary server can obtain information describing the characteristics of the receiving device, e.g., by requesting the receiving device, from data storage written the last time that receiving device was connected, or from some other available and connected source of such data. Such device characteristics can include processing capability, data storage capability, networking capability, etc., similarly as described above for block 422. If the method finds reduced capabilities on the receiving device (and/or on the sending device) which will provide a poorer quality call over the data network, then the selection score the data network can be adjusted to indicate less desirability to select the data network.

In block 520, the method adjusts the selection score(s) based on other user preferences that have not been taken into account in the blocks described above. For example, the sending user may have particular preferences for particular conditions, similarly as described above for block 424, and such user preferences and conditions can be examined to determine which network is more desirable to be used by the sending user under the current conditions, and the score(s) of the data and phone networks adjusted in accordance with such determinations. In some cases or implementations, user preferences of the receiving user can also be referenced and can influence the selection scores. For example, such preferences can be retrieved from the receiving device or other data storage. Such receiving user preferences can include designated users who are allowed to contact the receiving device (e.g., ring the receiving device to indicate an incoming call) at designated times, days, and/or events. For example, if a receiving user does not wish to receive the call at the present time, the call can be forwarded to a storage destination that can store recorded voice data or voice mail of a message that can be provided by the sending user. The storage destination can be located on the data network, in which case the data network can be selected or its score adjusted for desirability. Similarly, a storage destination accessible over the phone network can influence the selection of the phone network. Other receiving user preferences can also be taken into consideration in some implementations, similarly to example sending user preferences described above.

In block 522, the method selects one of the data network and the phone network to use for transmitting the voice call from the intermediary server to the receiving device. For example, the method can examine the selection scores for the data network and the phone network, and select the network having the score indicating greater desirability to use that network for the voice call. For example, in some implementations, the higher score indicates the network having greater desirability.

In block 524, the method selects an appropriate communication identity (e.g., address to use for the call) for the receiving device, if needed. For example, if the method has selected the phone network to use to connect to the receiving device, then the method can select a phone number of the receiving device in block 524. If the method has selected the data network in block 522, then the method can select an IP address or other data network address associated with the receiving user and for use on the data network. The method can perform this selection automatically, e.g., without user intervention in the selection process. In some cases the intermediary server has received from the sending device the communication identity of the receiving device to use as the address to which to send the call. In other cases, the intermediary server can determine the communication identity to use for the second stage of the call from the server to the receiving device, based on the network selected for that stage. For example, in some implementations, if the sending device sent the call to the intermediary server over the phone network via an intermediate phone number, the server can look up a receiving user or receiving device address (e.g., phone number or network address) that is associated with the called intermediate phone number in accessible data storage. In some cases, the server may not have the address of the associated receiving user or device stored in accessible storage, and can request this address from the sending device.

In block 526, the method causes the voice call to be sent from the intermediary server to the receiving device on the selected network in the second stage of the call. The intermediary server has received or determined the appropriate communication identity of the receiving device as the address to which to send the call. For example, as described above, the call can be sent over a selected data network directly to the receiving device that is connected to the data network using an IP (Internet Protocol) address or other type of data address. Or, the call can be transferred from the data network to the phone network and sent over the selected phone network to ring the receiving device using a phone number of the receiving device as the address.

In block 528, the method checks if the recipient at the receiving device has selected to upgrade to a video call (if such an upgrade is appropriate and possible). For example, if the conditions and user preferences allow the call to be upgraded to a video call, then the method can send a request or prompt to the receiving device that requests whether the receiving user wants to upgrade the call from a voice-only call to a video call including audio and video. For example, in some implementations, the receiving device can display to the receiving user an option to select a video call or an audio-only call. The selection of the user can be sent back to the intermediary server and/or to the sending device. Thus, if the recipient has not selected to upgrade to a video call, the method ends. If the recipient has selected the upgrade to a video call, then in block 530 the method can send a request for video data to the sending device (if needed), and the method causes a video stream of information received from the sending device to be sent to the receiving device. The video stream can be sent corresponding with the audio stream of data that encodes the sending user's voice, as well as information allowing the synchronization of these two streams in the output at the receiving device.

In some implementations or cases, e.g., if a call over a phone network is being made on the first and/or second stage of the call, a call request sent to the receiving device may include a caller ID that identifies the sender. If this caller ID would be the address (e.g., intermediate phone number) used by the server, the intermediary server can replace this server address with an address of the sending device or user, such as a phone number or data network address of the sending user or device, to indicate the true originator of the call to the receiving user.

In some implementations, the network paths selected as described above in FIGS. 4 and 5 for sending the initial voice call can also be used in the opposite direction for voice data and/or video data sent by the receiving device to the sending device. In other implementations, a different pathway can be used in the opposite direction than the pathway selected and used for the voice call as described above.

Various blocks and operations of methods 300-500 can be performed in a different order than shown and/or at least partially simultaneously, where appropriate. For example, some implementations can perform blocks of the methods at various times and/or based on events not related to a user editing an image. In some implementations, blocks or operations of methods 300-500 can occur multiple times, in a different order, and/or at different times in the methods. Various data used by the methods 300-500 can be stored on local and/or remote, network-connected storage device(s) that are accessible to the methods.

Some example scenarios using features illustrated above are now described. In one scenario, the sending user initiates a call to a receiving user using a sending device that has a good connection to a data network (e.g., a portable device or computer having Wi-Fi and/or Ethernet connection to the Internet). The sending device can obtain information about its connection over the data network to the intermediary server, and can also request and receive information from the intermediary server describing characteristics of a data network connection from the intermediary device to the receiving device (and characteristics of the receiving device, if available). In some implementations, the sending device can make decisions as to which network to use on both the first stage and the second stage using characteristics evaluation as described above. For example, the sending device can decide to use the data network between the sending device and the intermediary server, and also use the data network between the intermediary device and the receiving device, based on call characteristics and user preferences as described above. In one example, the sending device sees that the receiving device and user are present on the data network, and so a data network call is made over both stages. Other implementations can allow the intermediary server to make the decision for which network to use on the second stage. In another example, if the receiving user was not present on the data network, then the sending device could decide either to connect the first stage of the call via the data network and inform the intermediary server to make a call over the phone network for the second stage of the call (or the server decides to make the call over the phone network). In other implementations, the sending device could decide to use the phone network for the first stage and connect to the intermediary server, and the server could decide to use the phone network for the second stage.

In another scenario, the sending user is making a call using a sending device that does not presently have a connection to the data network. For example, the sending user can be using a cell phone and may be in a remote area without a connection to a wireless data network (e.g., Wi-Fi) and the Internet, but has access to the phone network, e.g., over a cell phone wireless network. The sending device must choose the phone network to call the intermediary server for the first stage of the call, since the phone network is the only network available. The sending device can make a decision to use a voice cell phone network or a data cell phone network for data transmission (assuming both types of cell phone network are available). For example, the sending device can examine user preferences to determine that the user does not want to use the data cell phone network due to higher costs (unless special conditions are present as stated in the user preferences, which currently are not present). The sending device uses the voice cell phone network by calling an intermediate phone number associated with the receiving user to connect to the intermediary server. In some cases, the intermediary server can then decide whether to use the data network or the phone network in the second stage to connect to the receiving device. The server can examine the existing call characteristics as well as preferences from the sending user and/or from the receiving user to determine which network to use for the second stage, as described above.

Some other implementations of the call system can omit the use of the intermediary server, and/or can provide all decisions for the initiation of a voice call and selection of communication network type on the sending device.

Figure 6:
FIGS. 6-11 are a diagrammatic illustrations of examples of displayed user interfaces that can be used in conjunction with one or more features described herein.

FIG. 6 is a diagrammatic illustration of one example of a user interface 600 that can be used with one or more features described herein. In some examples, interface 600 can be displayed on a display of a client device, e.g., a display screen of sending device 202. In this example, a device such as the sending device 202 displays user preferences of the user for voice calls. The selected user preferences can be used in various determinations described above when initiating a call as the sending user. In the interface shown, the user is able to select any of the preference options using an appropriate input device, e.g., a touchscreen, pointing device, etc.

A variety of user preferences can be provided for a user in various implementations and in a variety of formats. In this example, a list of importance ratings 602 are displayed for a number of different characteristics or conditions of a voice call. For example, the user can select whether each characteristic is of low importance, medium importance, or high importance to him or her. In some implementations, the methods described above can assign values to the selected importance ratings and adjust scores for the data network and phone network according to applicable preferences to assist in determining which network to use for the call.

Other examples of preferences can include location preference 604, in which a user can specify one or more locations where a call is preferred to use the data network when initiating a call from those locations, instead of using the phone network. For example, the user can select a label such as "home" as one of the locations, and can define that label with map coordinates, longitude/latitude, or other location information (not shown). In some implementations, a user can provide a list of such locations in a drop down list or other interface feature. For example, in some implementations, the methods described above can influence the score for the data network to be higher if the call is being initiated at any of those locations. Similarly, a person preference 606 can allow a user to specify one or more persons who, when designated as the recipient of a call, will lower the importance of the cost of the call in the determination of which network to use for the call. For example, in some implementations, the importance of cost is changed to "low" in the ratings 602 in response to any listed person being the recipient of the call. Other importance ratings can similarly be connected to other user preferences, and/or the user can define custom preferences. Various other various preferences can also be provided, some of which are described herein as examples.

Figure 7:

FIG. 7 is a diagrammatic illustration of an example of a user interface 700 that can be displayed similarly as interface 600 and can be used to select a recipient for a voice call on a sending device. In this example, a contacts area 702 of the interface 700 displays names of persons or other users (contacts) that the user of the device has stored on the device. In the interface shown, the user is able to select any of the contacts using an appropriate input device, e.g., a touchscreen, pointing device, etc.

A contact 706 has been selected by the user in FIG. 7. In response to the selection of contact 706, the user interface 700 can display the selected contact 708, e.g., in the lower section of the interface 700. In some implementations, address information 710 can also be displayed for the selected user, for informational purposes. For example, the address information 710 in FIG. 7 includes a phone number and an email address associated with the selected contact 708. Multiple such phone numbers and email addresses can be displayed for the selected contact if such addresses are available. In some implementations, if the selected user has one or more intermediate phone numbers that are associated with the intermediary server 206 and which are known by the device, then such intermediate phone numbers can also be displayed.

To initiate a call to the selected contact 706/708, the user can select the button control 712. Thus, the user need not choose any of the addresses of the selected user, since the sending device can automatically select the proper address for the network that is to be used to send the voice call according to features as described above. Various other interfaces can be used in other implementations.

Figure 8:
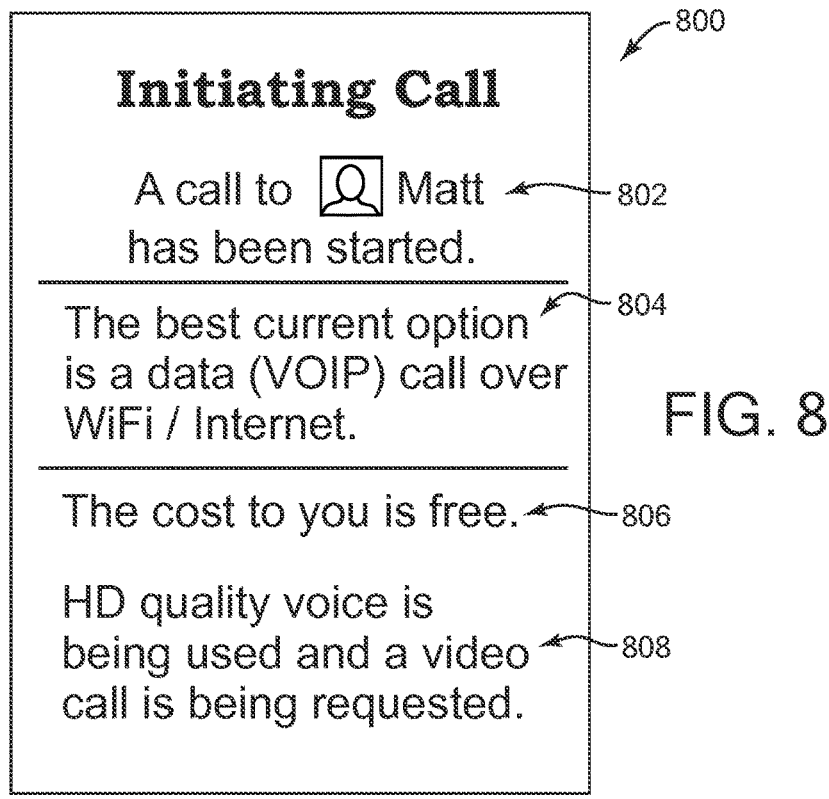

FIG. 8 is a diagrammatic illustration of an example of a notification 800 which can be displayed on a sending device in response to the sending user selecting the call control 712 of FIG. 7 to initiate the voice call. For example, notification 800 can be displayed while the call is being initiated and connected to the receiving device, e.g., to provide summarized results of the analysis of methods described above to determine which network to use for the voice call. For example, the notification 800 can include a message 802 indicating that the call to the selected user has been initiated. A message 804 can indicate which network(s) were automatically selected to use for the call, which in this case is the data network. The format of the call can also be indicated, which is VOIP in this example. In some implementations, if the second path of the call to the receiving device is known by the sending device at the time of the notification 800, that information can also be displayed. For example, the networks to be used in the first and second stages of the call to the receiving device can be displayed. In this example, a full data network call (e.g., the data network used for both stages of the call) is indicated by no display indicating use of the phone network. A cost 806 of the call can also be displayed, which in this case is free since the data network is being used for both the first stage and second stage of the call. Call upgrade information 808 can be displayed to indicate upgrade conditions or options that exist for the call. In this example, HD quality has been selected (e.g., based on call conditions and user preferences) and the call will be upgraded to a video call if the receiving user agrees to the video option.

Figure 9:
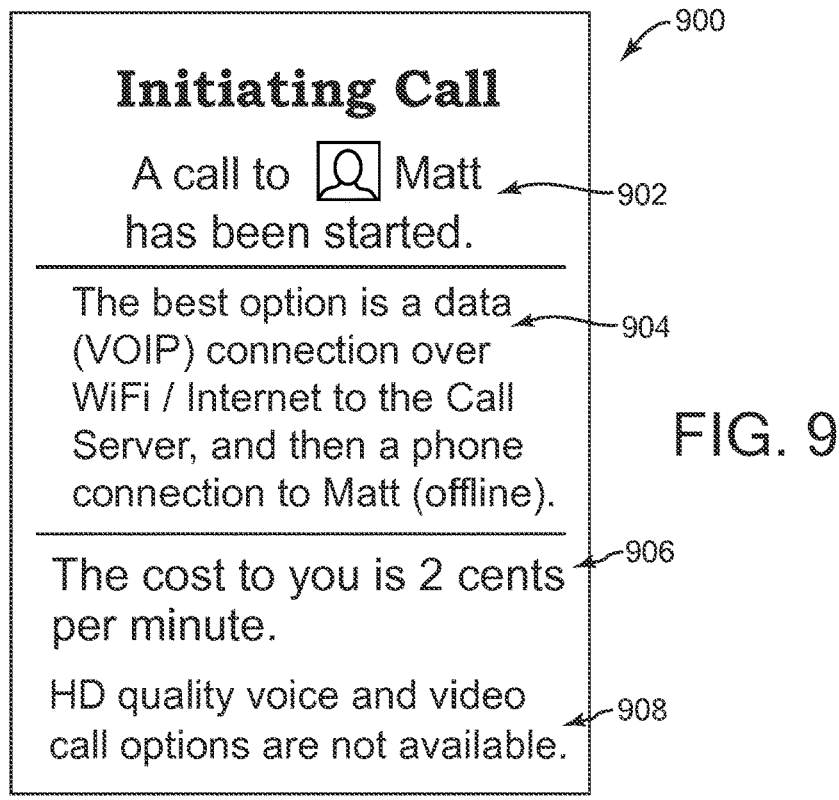

FIG. 9 is a diagrammatic illustration of another example of a notification 900 which can be displayed on a sending device in response to the sending user selecting the call control 712 of FIG. 7 to initiate the voice call. In this example, the message 904 indicates that the data network was selected for the first stage of the call from the sending device to the intermediary server, and the phone network was selected for the second stage of the call from the server to the receiving device. For example, the system may have selected the phone network because the receiving device was not currently present on the data network. The cost 906 of the call is also indicated, which in this example is a greater cost than the full data network call in the example interface 800 of FIG. 8 because of the phone network connection from the server to the receiving device. However, the system automatically selected the available data network for the first stage connection between sending device and intermediary server to lower the cost in comparison to using the phone network for the first stage connection. Call upgrade information 908 indicates that upgrade options are not available in this example, e.g., because of the phone network connection from the intermediary server to the receiving device.

Figure 10:
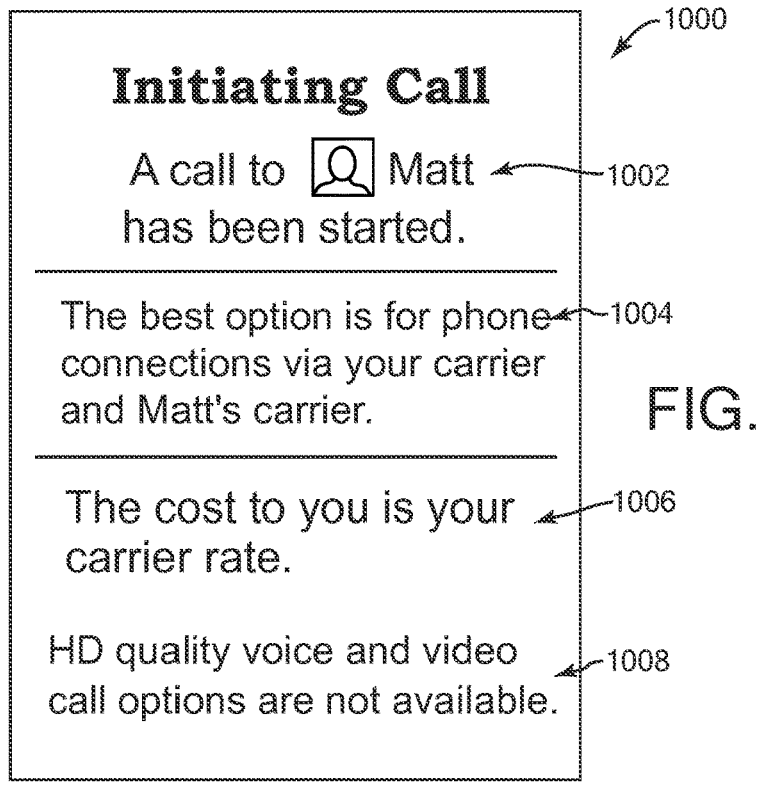

FIG. 10 is a diagrammatic illustration of another example of a notification 1000 which can be displayed on a sending device in response to the sending user selecting the call control 712 of FIG. 7 to initiate the voice call. In this example, the message 1004 indicates that the phone network was selected for the first and second stages of the call. For example, the sending device may not have a current connection to the data network, and so the phone network was selected for the first stage. Similarly, the receiving device may not be present on the data network, and so the intermediary server selected the phone network for the second stage. In some implementations, the intermediary server can relay information to the sending device indicating which network it has selected for the second stage (e.g., in some implementations, this information can be sent to the sending device via a cell phone data plan connection if no data network connection is available to the sending device). The cost 906 of the call is also indicated, which in this example is a cost determined by the carrier that provides the phone network service to the sending device. In some implementations, the sending device can access the actual carrier cost information and display it in notification 1000. In many cases, this cost will be greater than the full data network call in the example of FIG. 8 as well as the partial data network call in the example of FIG. 9, because of the phone network connection from the sending device to the server and from the server to the receiving device. Call upgrade information 1008 indicates that upgrade options are not available in this example, e.g., because of the phone network connection to the sending and receiving devices.

Figure 11:
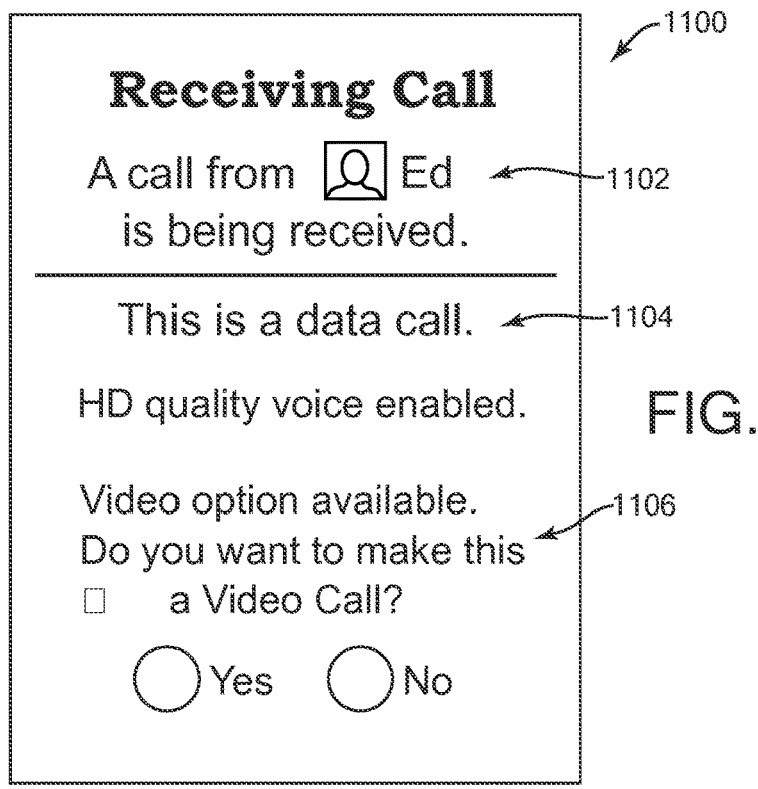

FIG. 11 is a diagrammatic illustration of an example of a notification 1100 which can be displayed on a receiving device in response to receiving a voice call originating from a sending device. In this example, an identity 1102 of the sending user is displayed (e.g., user name, caller ID, etc.). Information 1104 can also be displayed to indicate the type of call, e.g., a data call in this example, and which upgrade options are present for the call such as high definition audio. In some implementations, the notification 1100 can include a video call notification 1106 which indicates whether the call can be upgraded to a video call from an audio-only call. In this example, the receiving user is given an option to make the call a video call, or to make the call an audio-only call. If the user selects the video call, then this selection can be sent to the intermediary server and/or sending device, and video data or stream sent from the sending device can be received by the receiving device in addition to receiving audio voice data. Standard interface features can be used by the receiving device to manipulate incoming calls, e.g., to allow the user to answer the call, ignore the call, send the call to voice mail, etc. In some implementations, if the receiving device receives a call over the phone network, then a standard phone call interface can be displayed and used.

Figure 12:
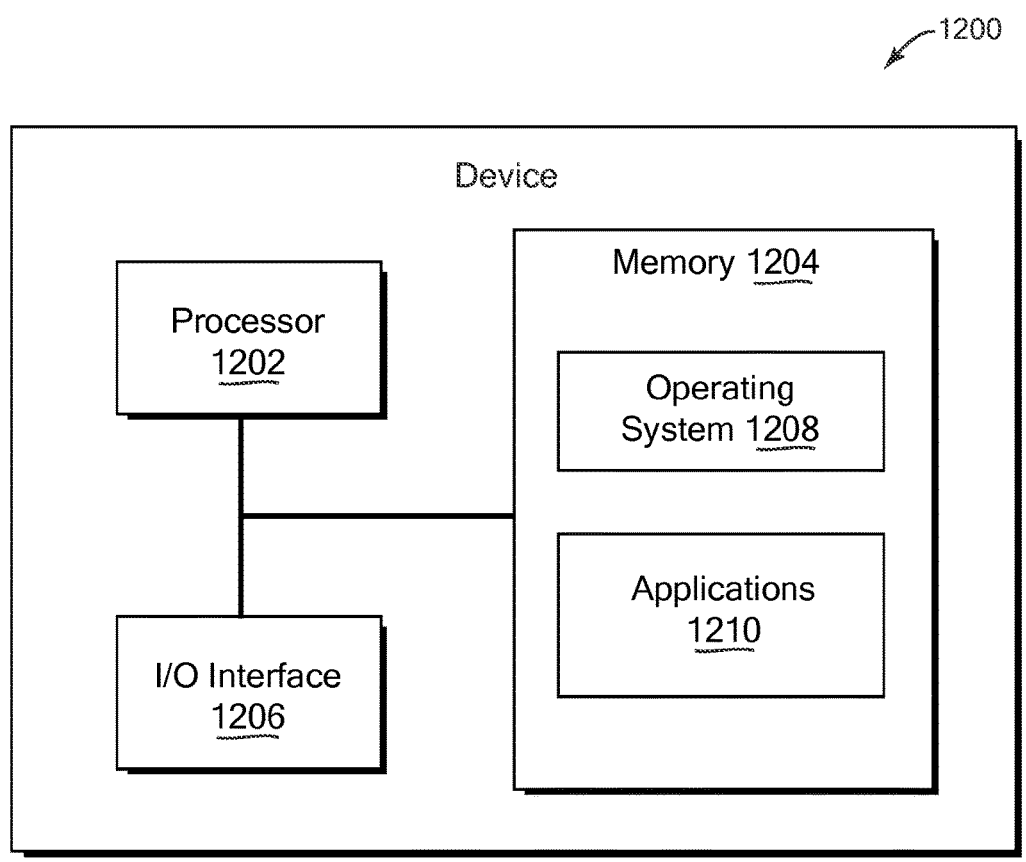
FIG. 12 is a block diagram of an example device which may be used for one or more implementations described herein.

FIG. 12 is a block diagram of an example device 1200 which may be used to implement one or more features described herein. In one example, device 1200 may be used to implement server device 104 of FIG. 1, and perform appropriate method implementations described herein. Device 1200 can be any suitable computer system, server, or other electronic or hardware device. For example, the device 1200 can be a mainframe computer, desktop computer, workstation, portable computer, or electronic device (portable device, cell phone, smart phone, tablet computer, television, TV set top box, personal digital assistant (PDA), media player, game device, wearable device, etc.). In some implementations, device 1200 includes a processor 1202, a memory 1204, and input/output (I/O) interface 1206. In some examples, a controller of the intermediary server 206, as well as the sending device 202 and/or of the receiving device 204 described above, can include components such as the processor 1202, memory 1204, and interface 1206.

Processor 1202 can be one or more processors or processing circuits to execute program code and control basic operations of the device 1200. A "processor" includes any suitable hardware and/or software system, mechanism or component that processes data, signals or other information. A processor may include a system with a general-purpose central processing unit (CPU), multiple processing units, dedicated circuitry for achieving functionality, or other systems. Processing need not be limited to a particular geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory.

Memory 1204 is typically provided in device 1200 for access by the processor 1202, and may be any suitable processor-readable storage medium, such as random access memory (RAM), read-only memory (ROM), Electrical Erasable Read-only Memory (EEPROM), Flash memory, etc., suitable for storing instructions for execution by the processor, and located separate from processor 1202 and/or integrated therewith. Memory 1204 can store software operating on the device 1200 by the processor 1202, including an operating system 1208 and one or more applications engines 1210 such as a graphics editing engine, web hosting engine, social networking engine, etc. In some implementations, the applications engines 1210 can include instructions that enable processor 1202 to perform the functions described herein, e.g., some or all of the methods of FIGS. 3-5. Any of software in memory 1204 can alternatively be stored on any other suitable storage location or computer-readable medium. In addition, memory 1204 (and/or other connected storage device(s)) can store intermediate phone numbers and associated device phone numbers and other addresses, lists of users and devices and device characteristics, user preferences, and/or other instructions and data used in the features described herein. Memory 1204 and any other type of storage (magnetic disk, optical disk, magnetic tape, or other tangible media) can be considered "storage devices."

I/O interface 1206 can provide functions to enable interfacing the device 1200 with other systems and devices. For example, network communication devices, storage devices such as memory and/or database 106, and input/output devices can communicate via interface 1206. In some implementations, the I/O interface can connect to interface devices such as input devices (keyboard, pointing device, touchscreen, microphone, camera, scanner, etc.) and output devices (display device, speaker devices, printer, motor, etc.).

For ease of illustration, FIG. 12 shows one block for each of processor 1202, memory 1204, I/O interface 1206, and software blocks 1208 and 1210. These blocks may represent one or more processors or processing circuitries, operating systems, memories, I/O interfaces, applications, and/or software modules. In other implementations, device 1200 may not have all of the components shown and/or may have other elements including other types of elements instead of, or in addition to, those shown herein. While system 102 is described as performing steps as described in some implementations herein, any suitable component or combination of components of system 102 or similar system, or any suitable processor or processors associated with such a system, may perform the steps described.

A client device can also implement and/or be used with features described herein, such as client devices 120-126 shown in FIG. 1. Example client devices can include some similar components as the device 1200, such as processor(s) 1202, memory 1204, and I/O interface 1206. An operating system, software and applications suitable for the client device can be provided in memory and used by the processor, such as client communication application software. The I/O interface for a client device can be connected to network communication devices (for data network and/or phone network communication), as well as to input and output devices such as a microphone for capturing sound, a camera for capturing images or video, audio speaker devices for outputting sound, a display device for outputting images or video, or other output devices. A display device, for example, can be used to display the images and other data as described herein, where such device can include any suitable display device such as an LCD, LED, or plasma display screen, CRT, television, monitor, touchscreen, 3-D display screen, or other visual display device. Some implementations can provide an audio output device, such as voice output or synthesis that speaks text and/or describes settings, notifications, and permissions.

Although the description has been described with respect to particular implementations thereof, these particular implementations are merely illustrative, and not restrictive. Concepts illustrated in the examples may be applied to other examples and implementations.

In situations in which the systems discussed here may collect personal information about users, or may make use of personal information, users may be provided with an opportunity to control whether programs or features collect user information (e.g., images depicting the user, information about a user's social network, user characteristics (age, gender, profession, etc.), social actions or activities, a user's preferences, or a user's current location). In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, a user may have control over how information is collected about the user and used by a server.

Note that the functional blocks, features, methods, devices, and systems described in the present disclosure may be integrated or divided into different combinations of systems, devices, and functional blocks as would be known to those skilled in the art. Any suitable programming language and programming techniques may be used to implement the routines of particular implementations. Different programming techniques may be employed such as procedural or object-oriented. The routines may execute on a single processing device or multiple processors. Although the steps, operations, or computations may be presented in a specific order, the order may be changed in different particular implementations. In some implementations, multiple steps or blocks shown as sequential in this specification may be performed at the same time.

What is claimed is:

1. A method comprising:
receiving, at an intermediary server, data of a voice call for communication between a sending device that initiated the voice call and a receiving device, wherein the data of the voice call is received from the sending device over one of a phone network or a data network as selected by the sending device based on one or more first characteristics of the voice call, wherein the intermediary server is coupled to the data network and the phone network, wherein the receiving device is associated with an intermediate phone number used as an address to the intermediary server in response to the data of the voice call being received over the phone network, wherein the intermediate phone number is one of a plurality of intermediate phone numbers used as addresses to the intermediate server, each of the plurality of intermediate phone numbers corresponding to a respective user or a respective user device;
choosing, based on one or more second characteristics of the voice call, one of the phone network or the data network to use to route the data of the voice call from the intermediary server to the receiving device;
selecting a communication identity for the receiving device different than the intermediate phone number based on the chosen network between the intermediary server and the receiving device; and
causing the data of the voice call to be sent to the receiving device over the chosen network using the communication identity.

2. The method of claim 1 wherein selecting the communication identity for the receiving device includes one of:
selecting a phone number of the receiving device different than the intermediate phone number in response to choosing the phone network, or
selecting a network address of the receiving device on the data network in response to choosing the data network.

3. The method of claim 1 wherein the intermediary server is coupled to the phone network by one or more first path gateways between the intermediary server and the sending device and by one or more second path gateways between the intermediary server and the receiving device.

4. The method of claim 1 wherein the one or more second characteristics of the voice call include one or more call characteristics of the receiving device.

5. The method of claim 1 wherein the one or more second characteristics of the voice call include at least one of:
one or more network conditions of the phone network and of the data network; or
a cost to the sending device to establish the voice call between the sending device and the receiving device.

6. The method of claim 1 wherein choosing, based on one or more second characteristics of the voice call, one of the phone network and the data network includes:
determining a phone network score for the phone network based on the one or more second characteristics; and
determining a data network score for the data network based on the one or more second characteristics,
wherein choosing one of the phone network and the data network is based on a comparison of the phone network score and the data network score.

7. The method of claim 1 wherein choosing one of the phone network or the data network is further based on obtained first user preference data that indicates one or more user preferences of a receiving user of the receiving device with respect to at least one of the one or more second characteristics.

8. The method of claim 7 wherein choosing one of the phone network or the data network is further based on obtained second user preference data that indicates one or more user preferences of a sending user of the sending device with respect to at least one of the one or more second characteristics.

9. The method of claim 7 wherein the user preferences of the receiving user indicate a permission to cause an alert at the receiving device during designated times upon receipt of the voice call from one or more designated users.

10. The method of claim 1 wherein selecting the communication identity for the receiving device includes searching data storage accessible to the intermediary server and obtaining the communication identity of the receiving device that is associated in the data storage with the intermediate phone number.

11. The method of claim 1 wherein selecting the communication identity for the receiving device includes sending a request to the sending device to obtain the communication identity of the receiving device that is associated with the intermediate phone number.

12. A system comprising:
a storage device; and
at least one processor configured to access the storage device and configured to perform operations comprising:
receiving, at an intermediary server, data of a voice call for communication between a sending device that initiated the voice call and a receiving device, wherein the data of the voice call is received from the sending device over one of a phone network or a data network as selected by the sending device based on one or more first characteristics of the voice call, wherein the intermediary server is coupled to the data network and the phone network, wherein the receiving device is associated with an intermediate phone number used as an address to the intermediary server in response to the data of the voice call being received over the phone network, wherein the intermediate phone number is one of a plurality of intermediate phone numbers used as addresses to the intermediate server, each of the plurality of intermediate phone numbers corresponding to a respective user or a respective user device;
obtaining one or more second characteristics of the voice call;
choosing, based on the second characteristics of the voice call, one of the phone network or the data network to use to route the data of the voice call from the intermediary server to the receiving device;
selecting a communication identity for the receiving device different than the intermediate phone number based on the chosen network between the intermediary server and the receiving device; and
causing the data of the voice call to be routed to the receiving device over the chosen network using the communication identity.

13. The system of claim 12 wherein the operation of selecting the communication identity for the receiving device includes one of:
selecting a phone number of the receiving device different than the intermediate phone number in response to choosing the phone network, or
selecting a network address of the receiving device on the data network in response to choosing the data network.

14. The system of claim 12 wherein the intermediary server is coupled to the phone network by one or more first path gateways between the intermediary server and the sending device and by one or more second path gateways between the intermediary server and the receiving device.

15. The system of claim 12 wherein the second characteristics of the voice call include at least one of:
   one or more call characteristics of the receiving device;
   one or more network conditions of the phone network and of the data network; or
   a cost to the sending device to establish the voice call between the sending device and the receiving device.

16. The system of claim 12 wherein the operation of choosing one of the phone network or the data network is further based on obtained user preference data that indicates one or more user preferences with respect to at least one of the one or more second characteristics, the obtained user preference data being associated with a receiving user of the receiving device, and a sending user of the sending device.

17. The system of claim 12 wherein the at least one processor is further configured to perform an operation comprising requesting the communication identity of the receiving device from the sending device, wherein the intermediate phone number is associated with the communication identity.

18. A non-transitory computer readable medium having stored thereon software instructions that, when executed by a processor, cause the processor to perform operations including:
   receiving, at an intermediary server, data of a voice call for communication between a sending device that initiated the voice call and a receiving device, wherein the data of the voice call is received from the sending device over one of a phone network or a data network as selected by the sending device based on one or more first characteristics of the voice call, wherein the intermediary server is coupled to the phone network by one or more first path gateways between the intermediary server and the sending device and by one or more second path gateways between the intermediary server and the receiving device, wherein the receiving device is associated with an intermediate phone number used as an address to the intermediary server in response to the data of the voice call being received over the phone network;
   obtaining one or more second characteristics of the voice call;
   choosing, based on the second characteristics of the voice call, one of the phone network or the data network to use to route data of the voice call from the intermediary server to the receiving device automatically and without user intervention;
   selecting a communication identity for the receiving device different than the intermediate phone number based on the chosen network between the intermediary server and the receiving device, wherein selecting the communication identity includes requesting the communication identity for the receiving device from the sending device, wherein the intermediate phone number is associated with the communication identity; and
   causing the data of the voice call to be routed to the receiving device over the chosen network using the communication identity.

19. The non-transitory computer readable medium of claim 18 wherein selecting the communication identity for the receiving device includes one of:
   selecting a phone number of the receiving device different than the intermediate phone number in response to choosing the phone network, or
   selecting a data address of the receiving device in response to choosing the data network.

20. The non-transitory computer readable medium of claim 18 wherein the first characteristics of the voice call include at least one of:
   one or more network conditions of the phone network and of the data network; or
   a cost to the sending device to establish the voice call between the sending device and the receiving device.

* * * * *